US009309103B2

(12) United States Patent
Ergican et al.

(10) Patent No.: US 9,309,103 B2
(45) Date of Patent: Apr. 12, 2016

(54) WATER DISPENSER SYSTEM

(71) Applicant: apiqe inc, Torrance, CA (US)

(72) Inventors: Erdogan Ergican, Torrance, CA (US);
Giancarlo Fantappie, Rancho Palos Verdes, CA (US); Mukul Anil Khairatkar, Torrance, CA (US); Sann Myint Naing, Monterey Park, CA (US); Jing Huang, Los Angeles, CA (US); Yoganathan Thierumaran, Torrance, CA (US)

(73) Assignee: CGP WATER SYSTEMS, LLC, Greenwich, CT (US)

( * ) Notice: Subject to any disclaimer, the term of this patent is extended or adjusted under 35 U.S.C. 154(b) by 141 days.

(21) Appl. No.: 14/138,712

(22) Filed: Dec. 23, 2013

(65) Prior Publication Data

US 2014/0239521 A1 Aug. 28, 2014

Related U.S. Application Data

(63) Continuation of application No. PCT/US2012/043797, filed on Jun. 22, 2012, which is a continuation-in-part of application No. 12/772,641, filed on May 3, 2010, now Pat. No. 8,567,767.

(Continued)

(51) Int. Cl.
*B01F 3/04* (2006.01)
*B67D 1/00* (2006.01)
(Continued)

(52) U.S. Cl.
CPC .............. *B67D 1/0058* (2013.01); *A23L 2/54* (2013.01); *B01F 3/04503* (2013.01);
(Continued)

(58) Field of Classification Search
CPC ... A23L 2/54; B01F 3/04737; B01F 3/04808; B01F 3/04815; B01F 3/04503; B01F 3/04787; B01F 5/0615; B01F 5/0641; B01F 5/0688; B01F 11/0208; B01F 2215/045; B01F 2215/0468; B67D 1/0058; B67D 1/0857; B67D 1/0895; Y10S 261/07
USPC .............. 261/34.1, 37, 38, 42, 44.1, 64.1, 66, 261/108, 113, DIG. 7
See application file for complete search history.

(56) References Cited

U.S. PATENT DOCUMENTS 1,029,236 A 6/1912 Shattuck et al.
2,162,842 A 6/1939 Dolison
(Continued)

FOREIGN PATENT DOCUMENTS

CN 1277594 A 12/2000
CN 1914123 A 2/2007
(Continued)

OTHER PUBLICATIONS

Chinese Office Action in CN Appl. Ser. No. 201180033123.X dated Nov. 30, 2014.
(Continued)

*Primary Examiner* — Charles Bushey
(74) *Attorney, Agent, or Firm* — Edward A. Gordon; Foley & Lardner LLP

(57) ABSTRACT

An apparatus is disclosed for dispensing water including: a main inlet configured to receive water from a source; a chilled water line, including: an in-line carbonator; a carbonator water inlet valve configured to selectively direct water from the main inlet to the carbonator; a carbonator gas inlet valve configured to selectively direct carbonating gas to the carbonator; and a chilled water line outlet. The apparatus may be integrated in a refrigerator or other major appliance.

22 Claims, 17 Drawing Sheets

Related U.S. Application Data

(60) Provisional application No. 61/500,451, filed on Jun. 23, 2011, provisional application No. 61/500,440, filed on Jun. 23, 2011, provisional application No. 61/500,469, filed on Jun. 23, 2011, provisional application No. 61/500,500, filed on Jun. 23, 2011, provisional application No. 61/500,461, filed on Jun. 23, 2011, provisional application No. 61/654,487, filed on Jun. 1, 2012.

(51) Int. Cl.
   *B67D 1/08* (2006.01)
   *A23L 2/54* (2006.01)
   *B01F 5/06* (2006.01)
   *B01F 11/02* (2006.01)

(52) U.S. Cl.
   CPC .......... *B01F 3/04787* (2013.01); *B01F 5/0615* (2013.01); *B01F 5/0641* (2013.01); *B01F 5/0688* (2013.01); *B01F 11/0208* (2013.01); *B67D 1/0857* (2013.01); *B67D 1/0895* (2013.01); *A23V 2002/00* (2013.01); *B01F 2215/045* (2013.01); *B01F 2215/0468* (2013.01)

(56) References Cited

U.S. PATENT DOCUMENTS

| | | |
|---|---|---|
| 2,173,979 A | 9/1939 | Picut |
| 2,271,982 A | 2/1942 | Van Kreveld et al. |
| 2,899,170 A | 8/1959 | Cornelius |
| 2,924,238 A | 8/1960 | Corenlius |
| 3,502,111 A | 3/1970 | Hansen |
| 3,526,391 A | 9/1970 | Church, Jr. |
| 3,648,984 A | 3/1972 | Mimura et al. |
| 3,744,762 A | 7/1973 | Schlicht |
| 3,761,066 A | 9/1973 | Wheeler |
| 4,068,830 A | 1/1978 | Gray |
| 4,078,578 A | 3/1978 | Buchholz |
| 4,081,863 A | 3/1978 | Rees |
| 4,087,862 A | 5/1978 | Tsien |
| 4,271,992 A | 6/1981 | Becker |
| 4,695,378 A | 9/1987 | Ackman et al. |
| 4,753,535 A | 6/1988 | King |
| 4,783,319 A | 11/1988 | Habrich et al. |
| 4,940,164 A * | 7/1990 | Hancock et al. ................ 222/66 |
| 5,033,651 A | 7/1991 | Whigham et al. |
| 5,050,806 A | 9/1991 | Anderson et al. |
| 5,064,097 A | 11/1991 | Brog et al. |
| 5,192,513 A | 3/1993 | Stumphauzer et al. |
| 5,473,909 A | 12/1995 | Kateman et al. |
| 5,510,060 A * | 4/1996 | Knoll .............................. 261/27 |
| 5,538,028 A | 7/1996 | Lombardo |
| 5,842,600 A | 12/1998 | Singleterry et al. |
| 5,934,328 A | 8/1999 | Conrad et al. |
| 6,041,970 A | 3/2000 | Vogel |
| 6,060,092 A | 5/2000 | Oesterwind et al. |
| 6,120,685 A | 9/2000 | Carlson et al. |
| 6,253,963 B1 | 7/2001 | Tachibana |
| 6,669,238 B1 | 12/2003 | Santy, Jr. |
| 7,048,148 B2 | 5/2006 | Roekens et al. |
| 7,059,591 B2 | 6/2006 | Bortkevitch et al. |
| 7,338,551 B2 | 3/2008 | Kozyuk |
| 7,445,133 B2 | 11/2008 | Ludovissie et al. |
| 7,513,398 B2 | 4/2009 | Miller |
| 7,600,911 B2 | 10/2009 | Bechtold |
| 7,815,078 B2 | 10/2010 | Robinson |
| 7,878,705 B2 | 2/2011 | Schauerte |
| 7,913,984 B2 | 3/2011 | Noguchi et al. |
| 8,091,737 B2 | 1/2012 | Smeller et al. |
| 8,109,413 B2 | 2/2012 | Schroeder et al. |
| 8,177,197 B1 | 5/2012 | Ergican |
| 8,191,867 B2 | 6/2012 | Spiegel |
| 8,499,978 B2 | 8/2013 | Dalchau et al. |
| 8,567,767 B2 * | 10/2013 | Fantappie .................... 261/79.2 |
| 8,631,974 B2 | 1/2014 | Piatnik et al. |
| 8,636,268 B2 | 1/2014 | Fantappie |
| 8,960,500 B2 | 2/2015 | Van Opstal et al. |
| 2001/0027809 A1 | 10/2001 | Guillaume et al. |
| 2003/0080037 A1 | 5/2003 | Mazzei |
| 2003/0080443 A1 * | 5/2003 | Bosko ............................ 261/21 |
| 2004/0251566 A1 | 12/2004 | Kozyuk |
| 2006/0051448 A1 | 3/2006 | Schryver et al. |
| 2006/0056271 A1 | 3/2006 | Kapila et al. |
| 2006/0086136 A1 * | 4/2006 | Maritan et al. ................... 62/389 |
| 2006/0138170 A1 | 6/2006 | Brim et al. |
| 2006/0280027 A1 | 12/2006 | Fulton |
| 2006/0288874 A1 | 12/2006 | Ziesel |
| 2007/0070807 A1 | 3/2007 | Bracht et al. |
| 2007/0257378 A1 | 11/2007 | Spiegel |
| 2009/0026637 A1 | 1/2009 | Goltenboth et al. |
| 2010/0024890 A1 | 2/2010 | Romanyszyn et al. |
| 2010/0107887 A1 | 5/2010 | Bentley et al. |
| 2010/0133708 A1 | 6/2010 | Fischer |
| 2011/0316175 A1 * | 12/2011 | Kumar et al. ................... 261/22 |

FOREIGN PATENT DOCUMENTS

| | | |
|---|---|---|
| DE | 197 42 301 | 11/1998 |
| DE | 10 2006 048 456 | 4/2008 |
| EP | 2 070 586 | 6/2009 |
| EP | 2 070 587 A1 | 6/2009 |
| JP | 2001-187326 | 7/2001 |
| JP | 2001-335520 | 12/2001 |
| JP | 2005-288052 | 10/2005 |
| JP | 2007-089710 | 4/2007 |
| JP | 2008-289990 | 12/2008 |
| KR | 10-2005-0095340 | 9/2005 |
| KR | 10-2006-0003947 | 1/2006 |
| KR | 10-2006-0102726 | 9/2006 |
| KR | 10-0634782 | 10/2006 |
| WO | WO-99/21798 | 5/1999 |
| WO | WO-00/07707 | 2/2000 |
| WO | WO-00/25904 A1 | 5/2000 |
| WO | WO-2005/075365 | 8/2005 |
| WO | WO-2007/028390 | 3/2007 |
| WO | WO-2008/120076 | 10/2008 |

OTHER PUBLICATIONS

European Search Report on EP Appl. Ser. No. 12802311.6 dated Nov. 13, 2014.
International Preliminary Report on Patentability for PCT Appl. Ser. No. PCT/US2011/033709 dated Nov. 6, 2012.
International Preliminary Report on Patentability for PCT Appl. Ser. No. PCT/US2012/043708 dated Dec. 23, 2013.
International Preliminary Report on Patentability for PCT Appl. Ser. No. PCT/US2012/043797 dated Dec. 23, 2013.
International Preliminary Report on Patentability for PCT Appl. Ser. No. PCT/US2012/043873 dated Dec. 23, 2013.
International Preliminary Report on Patentability for PCT Appl. Ser. No. PCT/US2012/044041 dated Dec. 23, 2014.
International Search Report for PCT Appl. Ser. No. PCT/US2011/033709 dated Oct. 21, 2011.
International Search Report for PCT Appl. Ser. No. PCT/US2012/043708 dated Jan. 28, 2013.
International Search Report for PCT Appl. Ser. No. PCT/US2012/043797 dated Nov. 26, 2012.
International Search Report for PCT Appl. Ser. No. PCT/US2012/044041 dated Jan. 25, 2013.
Office Action in Mexican Appl. Ser. No. Mx/a/2012/012838 dated Dec. 8, 2014.
Office Action in Mexican Patent Appl. Ser. No. Mx/a/2012/012838 dated Apr. 22, 2014.
US Notice of Allowance in U.S. Appl. No. 12/772,641 dated Aug. 16, 2013.
US Notice of Allowance in U.S. Appl. No. 13/780,977 dated Oct. 16, 2013.
US Office Action in U.S. Appl. No. 12/772,641 dated Nov. 29, 2012.

(56) References Cited

OTHER PUBLICATIONS

US Office Action in U.S. Appl. No. 12/772,641 dated Jun. 4, 2012.
US Office Action in U.S. Appl. No. 13/780,977 dated Jun. 4, 2013.
Chinese Office Action in CN Appl. Ser. No. 201180033123.X dated Mar. 6, 2015.
European Search Report in Application No. 12802533.5, dated Jul. 21, 2015.
Japanese Office Action in JP Appl. Ser. No. 2013-509106 dated Mar. 16, 2015.
U.S. Office Action in U.S. Appl. No. 14/138,831 dated Aug. 27, 2015.
U.S. Office Action in U.S. Appl. No. 14/138,817, dated Oct. 15, 2015.
U.S. Office Action in U.S. Appl. No. 14/162,343, dated Oct. 30, 2015.
U.S. Office Action in U.S. Appl. No. 14/138,817 dated Mar. 26, 2015.

* cited by examiner

| User Selection | Valves Activated |
|---|---|
| Room Temperature | Main Valve + Room Temperature Valve |
| Chilled | Main Valve + Chilled Valve |
| Sparkling | Main Valve + Chilled Valve + Sparkling Valve |
| Hot | None |
| Hot | None |
| Hot + Hot | Main Valve + Hot Valve |

*Fig. 4*

WATER DISPENSER SYSTEM

CROSS-REFERENCE TO RELATED APPLICATIONS

This application is a continuation of International Application Number PCT/US2012/043797, filed Jun. 22, 2012, which claims the benefit of each of U.S. Provisional Application Nos. 61/500451, 61/500469, 61/500500, 61/500440, 61/500461, each filed Jun. 23, 2011, and of U.S. Provisional Application No. 61/654487, filed Jun. 1, 2012. The entire contents of each of the foregoing applications are incorporated by reference herein.

For the purposes of the United States of America, this application is a continuation-in-part of U.S. patent application Ser. No. 12/772,641, filed May 3, 2010 (now U.S. Pat. No. 8,567,767), the contents of each of the foregoing applications are incorporated by reference herein.

BACKGROUND

Numerous types of water dispensers are available, including dispensers for chilled, unchilled (e.g., room temperature), and heated water. Some water dispensers dispense carbonated water. Water dispensers can include a reservoir or a pressurized source. Water dispensers may be stand alone devices, or incorporated into an appliance such as a refrigerator.

Most commercialized devices for carbonating water use carbon dioxide sprayed into a water container: the result obtained with this process is very poor and the carbonation of water is weak and does not last too long. In addition, the quality of carbonated water varies as the mixing ratio and equilibration time changes. Devices for producing and dispensing carbonated beverages in water dispensing units, instead, typically employ a carbonating tank, called a saturator, and a high-pressure water pump. Carbonated water is produced by pressurizing the saturator tank with carbon dioxide and filling the tank with chilled water. Due to the high pressures resident in the saturator tank, typically around 70 psi, a relatively expensive high pressure water pump is required to inject water into the tank. Furthermore, under the conditions in the saturator tank, the carbon dioxide takes time to dissolve into to the water and achieve a palatable level of carbonization. Accordingly, the saturator is typically large enough to hold a ready supply of carbonated water for dispensing and does not create new carbonated water instantaneously on demand. To maintain this supply, two or more sensors-and associated electronic controls-are used to start the high pressure pump and inject water into saturator when the level of carbonated water in the saturator falls below a set threshold and then stop the water injection when the tank fills to an appropriate level.

These typical carbonization devices take up a relatively large amount of space and require expensive and complicated electronic and hydraulic control systems. Due to this complex structure, these devices are noisy, use significant amounts of energy, and require frequent maintenance. Another disadvantage of such system is that the stagnant carbonated water in the saturator can deteriorate the materials in the saturator resulting in unpleasant taste in the carbonated water.

SUMMARY

The applicants have realized that it would be advantageous to provide a system for dispensing carbonated water featuring an in-line carbonator. Systems of the type described herein provide palatable levels of carbonation without the use of a conventional saturator. Accordingly, a feature rich system for dispensing carbonated water and, optionally, non-carbonated ("still") water, may be provided while maintaining a relatively small form factor. In some embodiments, the system can provide one or more of chilled (carbonated or still), unchilled (e.g., room temperature), and heated water.

In one aspect, an apparatus is disclosed for dispensing water including: a main inlet configured to receive water from a source; a chilled water line, including: an in-line carbonator; a carbonator water inlet valve configured to selectively direct water from the main inlet to the carbonator; a carbonator gas inlet valve configured to selectively direct carbonating gas to the carbonator; and a chilled water line outlet. The apparatus may also include a heat exchanger configured to chill water passing through the chilled water dispensing line; and a controller configured to control the carbonator water and gas inlet valves. In some embodiments, when the carbonator water inlet valve is open and the carbonator gas inlet valve is closed, the chilled water line dispenses still water at the chilled water line outlet. In some embodiments, when the carbonator water inlet valve is open and the carbonator gas inlet valve is open, the chilled water line dispenses carbonated water at the chilled water line outlet.

Some embodiments include an unchilled water line including: an unchilled water inlet valve configured to selectively direct water from the main inlet to an unchilled water line outlet. In some embodiments, the unchilled water inlet valve is controlled by the controller.

Some embodiments include a hot water line including: a hot water inlet valve configured to selectively direct water from the main inlet to a hot water line outlet; a heater which heats water passing through the hot water line; and a hot water line outlet.

In some embodiments, the heat exchanger includes a cooling tank configured to receive water from the main inlet; and at least a portion of the chilled water line is immersed in the cooling tank.

In some embodiments, the in-line carbonator is immersed in the cooling tank.

In some embodiments, the chilled water line includes a coil immersed in the cooling tank.

Some embodiments include: a cooling tank fill sensor in communication with the controller and configured to generate information indicative of a fill level of the cooling tank; and a cooling tank fill valve controlled by the controller and configured to selectively direct water from the main inlet to the cooling tank. In some embodiments, the controller is configured to control the operation of the cooling tank fill valve based on the information indicative of a fill level of the cooling tank.

Some embodiments include a dispenser nozzle in fluid communication with the chilled water line outlet, the unchilled water line outlet, and the hot water line outlet.

Some embodiments include a main inlet valve controlled by the controller and configured to selectively interrupt the flow of water from the inlet to the chilled, unchilled, and hot water lines.

In some embodiments, the chilled water line includes a water pump configured to pump water to the carbonator.

In some embodiments, the chilled water line includes a flow compensator configured to receive water from an outlet of the carbonator, modify the flow, and direct the flow towards the chilled water line outlet.

Some embodiments include a carbonator gas source in fluid communication with the carbonator gas inlet valve.

In some embodiments, the gas source includes a canister of pressurized carbon dioxide.

In some embodiments, substantially the entire apparatus is contained within an enclosure.

In some embodiments, the enclosure fits inside a cube having 0.3 m long sides, 0.5 m long sides, or 1.0 m long sides.

In some embodiments, the chilled water dispensing line is configured to receive water at a temperature of about 20 C or greater, and dispense chilled water at a temperature of about 10 C or less at a flow rate of about 25 L/hour or more.

In some embodiments, the chilled water line is configured to receive water at a temperature of about 20 C or greater, and dispense chilled water at a temperature of about 10 C or less at a flow rate of about 50 L/hour or more.

In some embodiments, the chilled water line is configured to dispense carbonated water with a carbonation level of at least 2 g/L, at least 5 g/L, at least 10 g/L, or at least 15 g/L.

In some embodiments, the carbonator includes: a conduit; an inlet to a flow path on the proximal end of the conduit; one or more dispersion elements arranged within the conduit; a passive accelerator within the conduit; a rigid impact surface immediately downstream of the passive accelerator; and a retention network connected to the distal end of the conduit.

In some embodiments, the carbonator includes: a conduit; an inlet for directing carbon dioxide and water into the conduit; a rigid surface within the conduit; and a restriction within the conduit for accelerating the carbon dioxide and water to a speed sufficient such that when the carbon dioxide and water collide with the rigid surface they create an energy density sufficient to solubilize carbon dioxide in water.

Some embodiments include a filter.

In some embodiments, the filter is arranged such that all water passing from the main inlet to each of the chilled water line, unchilled water line, and hot water line passes through the filter.

In some embodiments, the heater is configured to heat water in the hot water line to a temperature of 85 C or more.

In another aspect, a method is disclosed including: providing or obtaining the apparatus of any of the types described above; connecting the main inlet to a water source; and connecting the carbonator gas inlet valve to a carbon dioxide gas source.

Some embodiments include selectively dispensing chilled still and carbonated water based on a user selection.

Some embodiments include selectively dispensing chilled still, chilled carbonated and unchilled water based on a user selection.

In some embodiments, the water source includes a source external to the apparatus.

In some embodiments, the water source includes a source internal to the apparatus.

In some embodiments, the carbon dioxide gas source includes a source external to the apparatus.

In some embodiments, the carbon dioxide gas source includes a source internal to the apparatus.

In another aspect, an apparatus is disclosed for dispensing water including: a main inlet configured to receive water from a water source; and a carbonated water line, including: a carbonator water inlet; a carbonator gas inlet; an in-line carbonator configured to receive water though the water inlet and gas through the gas inlet; and a carbonated water line outlet.

In some embodiments, substantially the entire apparatus is contained within an enclosure.

In some embodiments, the enclosure fits inside a cube having 0.3 m long sides, 0.5 m long sides, or 1.0 m long sides (in other embodiments any suitable size may be used).

In some embodiments, the chilled water line is configured to dispense carbonated water with a carbonation level of at least 2 g/L, at least 5 g/L, at least 10 g/L, or at least 15 g/L.

In one aspect, an apparatus for dispensing water is disclosed, the apparatus including: a dispenser integrated in a refrigerator, the dispenser including: a main inlet configured to receive water from a source; a chilled water line, including: an in-line carbonator; a carbonator water inlet valve configured to selectively direct water from the main inlet to the carbonator; a carbonator gas inlet valve configured to selectively direct carbonating gas to the carbonator; and a chilled water line outlet; a heat exchanger configured to chill water passing through the chilled water dispensing line; and a controller configured to control the carbonator water and gas inlet valves. In some embodiments, when the carbonator water inlet valve is open and the carbonator water inlet valve is closed, the chilled water line dispenses still water at the chilled water line outlet; and when the carbonator water inlet valve is open and the carbonator water inlet valve is open, the chilled water line dispenses carbonated water at the chilled water line outlet.

Some embodiments include: an unchilled water line including: an unchilled water inlet valve configured to selectively direct water from the main inlet to an unchilled water line outlet where the unchilled water inlet valve is controlled by the controller.

Some embodiments include a dispenser nozzle in fluid communication with the chilled water line outlet.

In some embodiments, the chilled water line includes a water pump configured to pump water to the carbonator.

In some embodiments, the chilled water line includes a flow compensator configured to receive water from an outlet of the carbonator, modify the flow, and direct the flow towards the chilled water line outlet.

Some embodiments include a carbonator gas source in fluid communication with the carbonator gas inlet valve.

In some embodiments, the gas source includes a canister of pressurized carbon dioxide.

Some embodiments include the refrigerator.

In some embodiments, the dispenser is mounted in a door of the refrigerator.

In some embodiments, water in the chilled water line is cooled using a component of a refrigeration system of the refrigerator.

In some embodiments, where the chilled water dispensing line is configured to receive water at a temperature of about 20 C or greater, and dispense chilled water at a temperature of about 10 C or less at a flow rate of about 25 L/hour or more, or about 50 L/hour or more, e.g., in the range of 10-100 L/hour or any subrange thereof.

In some embodiments, chilled water line is configured to dispense carbonated water with a carbonation level of at least 2 g/L, at least 5 g/L, at least 10 g/L, at least 15 g/L, or more, e.g. in the range of 0-30 g/L or any subrange thereof.

In some embodiments, the carbonator includes: a conduit; an inlet to a flow path on the proximal end of the conduit; one or more dispersion elements arranged within the conduit; a passive accelerator within the conduit; a rigid impact surface immediately downstream of the passive accelerator; and a retention network connected to the distal end of the conduit.

In some embodiments, the carbonator includes: a conduit; an inlet for directing carbon dioxide and water into the conduit; a rigid surface within the conduit; and a restriction within the conduit for accelerating the carbon dioxide and water to a speed sufficient such that when the carbon dioxide and water collide with the rigid surface they create an energy density sufficient to solubilize carbon dioxide in water.

Some embodiments include a filter. In some embodiments, the filter is arranged such that all water passing from the main inlet to the chilled water line passes through the filter.

In another aspect, a method including: providing the apparatus of any one of claims 1-65; connecting the main inlet to a water source; and connecting the carbonator gas inlet valve to a carbon dioxide gas source.

Some embodiments include: selectively dispensing chilled still and carbonated water based on a user selection.

Some embodiment include selectively dispensing chilled still, chilled carbonated and unchilled water based on a user selection.

Various embodiments may include any of the above described elements, alone or in any suitable combination.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The accompanying drawings, which are incorporated in and constitute a part of this specification, illustrate one or more embodiments described herein and, together with the description, explain these embodiments. Like reference characters refer to the same parts throughout the different views. The drawings are not necessarily to scale, emphasis instead being placed upon illustrating the principles of the embodiments.

FIG. 4 shows a chart illustrating the valve control states of the water dispenser of FIG. 1 for various user function selections.

DETAILED DESCRIPTION

Figure 1:
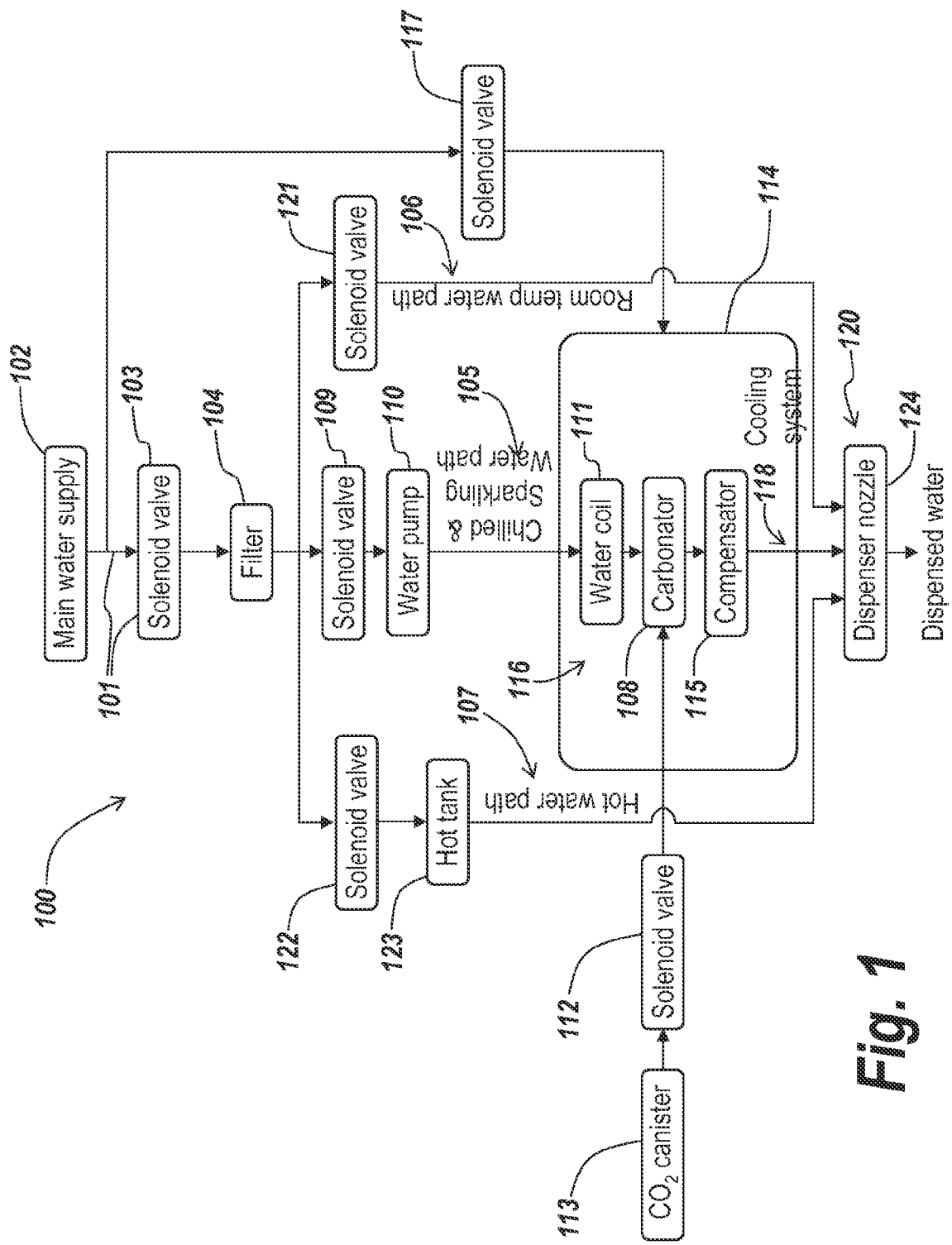
FIG. 1 is a functional block diagram of a water dispenser.

FIG. 1 is a functional block diagram of a water dispenser 100. The dispenser 100 includes a main inlet 101 which receives water from a main water supply 102. The main water supply may be any suitable source including a reservoir or a pressurized water source. In typical embodiments, the main water supply 102 is external to the dispenser (e.g., a plumbed water line). However, in some embodiments, the dispenser 100 may include the main water supply (e.g., when dispenser 102 includes a water storage tank).

Water from the main inlet 101 is directed through a main inlet valve 103. The main inlet valve 103 may be controlled (e.g., opened or closed) by a controller 200 (see FIG. 2). Water from the main inlet valve flows through a filter and is directed to three water dispensing lines: a chilled and sparkling water line 105, an unchilled water line 106, and a hot water line 107. In various embodiments, one or more of these lines may be omitted. In some embodiments additional lines may be included.

The chilled water line 105 includes an in-line carbonator 108. The in-line carbonator 108 does not require a cumbersome saturation tank as in conventional carbonation system. For example, in some embodiments, the in-line carbonator is, e.g., of the type described in U.S. patent application Ser. No. 12/772,641 filed May 3, 2010 entitled "APPARATUSES, SYSTEMS AND METHODS FOR EFFICIENT SOLUBILIZATION OF CARBON DIOXIDE IN WATER USING HIGH ENERGY IMPACT," the entire contents of which are incorporated herein by reference. This reference describes an apparatus that can be placed in a water line path to create carbonated water for dispensing. The apparatus accepts carbon dioxide and water through an inlet path. From there the flow of carbon dioxide and water are passed through one or more dispersion elements arranged within the conduit to create a dispersed flow (e.g., an annular dispersed flow). The dispersed flow then passes through a passive accelerator within the conduit, thereby greatly increasing the kinetic energy of the system. The accelerated flow is directed to collide with a rigid impact surface immediately downstream of the passive accelerator. This collision creates sufficient pressure to solubilize the carbon dioxide into the water. A retention network is provided at the output of the apparatus to collect and regulate the flow of carbonated water. An example of a suitable in-line carbonator is described in greater detail below, with reference to FIG. 5.

The chilled water line may include a carbonator water inlet valve 109 which is controlled by the controller 200 to selectively allow a flow of water from the filter 104 to the carbonator 108. Optionally, the chilled water line 105 may include a water pump 110, which pumps water to the carbonator 108 (e.g., at a desired pressure level). The water pump 110 may be controlled by the controller 200. The chilled water line may include a coil 111 (e.g., a stainless steel coiled tube) through which water passes on the way to the carbonator 108 (e.g., to facilitate chilling of the water prior to entry into the carbonator, as described below).

A carbonator gas inlet valve 112 is controlled by the controller 200 to selectively allow the flow of a carbonating gas (as shown carbon dioxide) from a pressurized gas source 113 (e.g., a canister). The gas source 113 may be located within the dispenser 100, or may be located externally.

Figure 10:
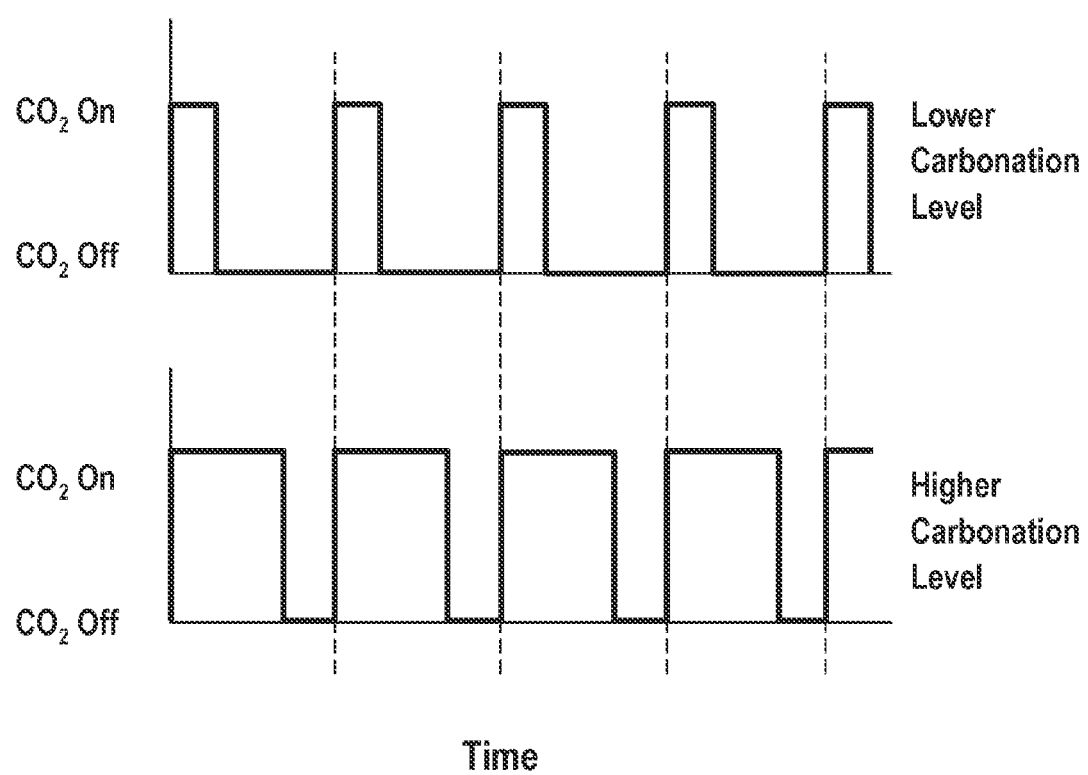
FIG. 10 illustrates gas inlet valve pulse sequences for controlling carbonation level in a volume of dispensed beverage.

Referring to FIG. 10, in some embodiments, the carbonation level in a dispensed carbonated beverage may be controlled by pulsing the gas inlet valve 112 controlling the flow of gas (as shown, $CO_2$) to the carbonator. In the example shown, while the carbonator water inlet valve 109 is open, the gas inlet valve 112 is pulsed between a fully closed and a fully open position at a fixed pulse frequency, but variable duty cycle. For a lower carbonation level, a lower duty cycle is used (top frame). For a higher carbonation level, a higher duty cycle is used (lower frame). As shown, four repetitions of the pulsation are used, but in various embodiments, any suitable number of repetitions may be used.

As will be understood by one skilled in the art, in various embodiments other suitable pulse schemes may be used to control the carbonation level, including variable frequency schemes. In some embodiments, the carbonation level may by controlled by controlling the gas inlet valve 112 to operate in one or more partially open positions.

In embodiments where a fixed volume of carbonated beverage is dispensed (e.g., in response to a single button push), the carbonation level in the dispensed volume may be controlled by controlling the amount of time or volume that the gas inlet valve is open during the dispensing operation. For example, for a higher level of carbonation, the gas inlet valve 112 may be left open during 100% of the dispensing operation, while for a lower level of carbonation, the gas inlet valve may be left open during 80% of the dispensing operation.

When the main inlet valve 103, carbonator water inlet valve 109 and carbonator gas inlet valve 112 are open, water and gas flow to the carbonator which outputs carbonated water. When the main inlet valve 103 and carbonator water inlet valve 109 are open, but carbonator gas inlet valve 112 is closed, only water flows to the carbonator. Accordingly, no carbonation occurs, and the carbonator outputs chilled still water.

Water output from the carbonator may flow through a flow compensator 115 which operates to condition the flow from the carbonator. In some cases carbonation devices produce an outflow of carbonated water that is more turbulent than desired. The turbulence of the flow may degrade the level of carbonation or produce a poorly controlled or inconsistent output flow rate. The compensator may allow for adjustable control of the flow rate through the compensator, the level of carbonation, the turbulence of the flow, the flow velocity, or other flow properties. Any suitable compensator may be used, including those described in U.S. Provisional Patent Application No. 61/500,461 incorporated by reference above. One example of a flow compensator is described in detail below, with reference to FIGS. 6A and 6B.

A heat exchanger 114 is provided which cools water flowing through the chilled water line (e.g., through the coil 111). As shown, the heat exchanger 114 includes a cooling tank 116 which is filled with a cooling fluid (as shown, water) in which one or more of the water coil 111, carbonator 108, and flow compensator 115 are immersed. In some embodiments, the cooling fluid in the cooling tank is cooled by a refrigeration system which includes a compressor and condenser (see FIG. 3). As will be understood by one skilled in the art, in various embodiments the carbonator 108, and flow compensator 115 can be installed outside of the cooling tank 116.

For example, in one embodiment, a refrigeration cycle of the heat exchanger includes a compressor, evaporator coil, capillary coil, and a condenser with silent fans. In some embodiments, the system is compact but has high efficiency cooling capacity, which is critical for large demand applications and to obtain good quality sparkling water. Heat exchange between the drinking water to be dispensed and the heat exchange medium filling the cooling tank 116 is provided by the evaporator coil, which is enclosed in the cooling tank unit of the heat exchanger. As described above, the cooling tank 116 is filled with water to serve as the cooling medium. The drinking water to be cooled passes through a stainless steel coil 111 that is immersed in the cooling medium. Water flowing through the stainless steel coil is incrementally cooled down to the desired temperature prior to dispensing. In some embodiments, the optimized cooling cycle and the design of the heat exchanger is to provide a high thermal efficiency and a dispensed water temperature of less than about 10 C.

In various embodiments, any other suitable controlled cooling devices and techniques may be applied.

In some embodiments, the fill level of the cooling tank 116 may be adjusted by controlling a tank fill valve 117, which selectively allows water to flow from the main inlet 101 to the cooling tank 116. The tank fill valve 117 may be controlled by the controller 200. In some embodiments, the fill level is controlled automatically. A tank fill sensor (not shown) sends a signal to the controller 200 indicating the fill level of the cooling tank 116. If the fill level drops below a threshold level (e.g., due to evaporation), the fill valve 117 is opened to fill the tank until a desired fill level is reached.

In some embodiments, at least one cold control sensor (not shown) senses the temperature of water in the chilled water line or cooling tank and provides a signal to the controller 200. Based on this signal, the controller 200 may control the heat exchanger to provide a desired chilled water temperature or temperature range (e.g., by turning the compressor and condenser fans on or off).

Chilled water from the chilled water line 105 flows through a chilled water line outlet 118 to a dispenser nozzle unit 120 for dispensing.

The unchilled water line 106 includes a unchilled water line inlet valve 121 controlled by the controller 200 to selectively allow water to flow from the filter 104 to the dispenser nozzle unit 120 to provide unchilled (e.g., room or ambient temperature) water. In various embodiments, the unchilled water line 106 may also include any suitable water pumps, filters, flow control devices, etc.

The hot water line 107 includes a hot water line inlet valve 122 controlled by the controller 200 to selectively allow water to flow from the filter 104 to a hot water tank 123. Water in the tank is heated by a heater (not shown) controlled by the controller 200. One or more temperature sensors may be provided which provide signals to the controller 200 and allow for automatic temperature control for the water in the hot tank. One or more hot tank fill sensors may sense the fill level of the hot tank, and provide signals to the controller to allow the controller to control the hot tank fill level (e.g., by selectively opening and closing the hot water line inlet valve 122). Alternatively, the hot tank can be filled by user operation without a hot tank fill sensor or controller such that at steady-state operation the hot tank is always full.

The hot water tank may include an agitator (e.g., an agitator pump) that agitates the water in the tank. The agitator may be controlled by the controller 200.

Water from the hot water tank 123 is outlet to the dispenser nozzle unit 120 for dispensing. In various embodiments, the hot water line 107 may also include any suitable water pumps, filters, flow control devices, etc.

The dispenser nozzle unit 120 receives water from the water lines 105, 106, and 107 and outputs the water from a single nozzle. In some embodiments, multiple nozzles may be used.

The dispenser nozzle may include a UV light 124 (e.g., a UV light or UV light emitting diode or "LED") which illuminates the dispensed water to provide disinfection. The UV light may be controlled by the controller 200.

The dispenser 100 includes a number of controllable valves. In some embodiments, these valves may be solenoid type valves. In various embodiments, any suitable types of controllable valves known in the art may be used. In typical embodiments, the valves are controlled by the controller 200 (described in detail below). However, in some embodiments, one or more valves are manually controlled.

Figure 2:
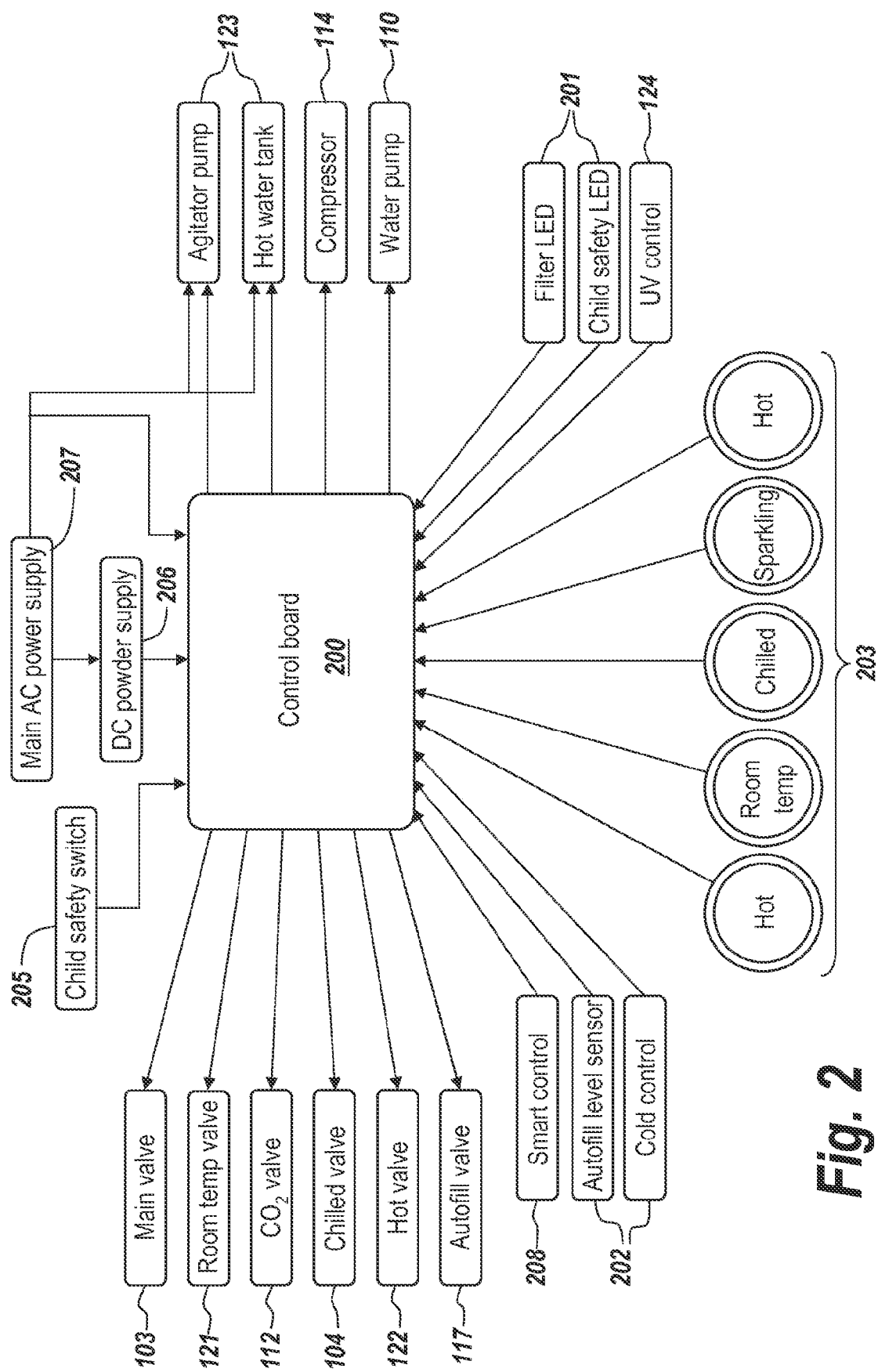
FIG. 2 is a functional block diagram of a controller for the water dispenser of FIG. 1.

Referring to FIG. 2, the controller 200 controls various components of dispenser 100, as described above. In some embodiments, the controller 200 is implemented on a control board that includes one master microcontroller, which controls components and connected peripherals of the system with the help of other peripheral chips on the control board.

The controller 200 controls the open/closed state of the main inlet valve 103, the carbonator water inlet valve 109, the carbonator gas inlet valve 112, the cooling tank fill valve 117, the unchilled water line inlet valve 121, and the hot water inlet valve 122. The controller 200 further controls the operation state of the heat exchanger 114 (e.g., by controlling the compressor and the condenser fans of the heat exchanger to turn on/off), the water pump, the hot water tank (e.g., to turn a heater on/off, control the heating level, turn the agitator pump on/off, etc.), the UV light 124, etc. The controller 200 may further control various displays or indicators 201 (e.g., an LED based display or indicator light). For example, the controller may control LED indicators 201 that indicate the need to change the filter 104 or that a child safety switch has been activated. Other user interface features such as a LCD can also be added and controlled by the controller 200.

As described above, the controller 200 may receive signals from various sensors 202 including a cooling tank fill level sensor and a chilled water line temperature sensor. Other sensor types may include overflow sensors, sensors which monitor the state of one or more components (e.g., the open/closed state of a valve), or any other suitable sensor.

Figure 3:
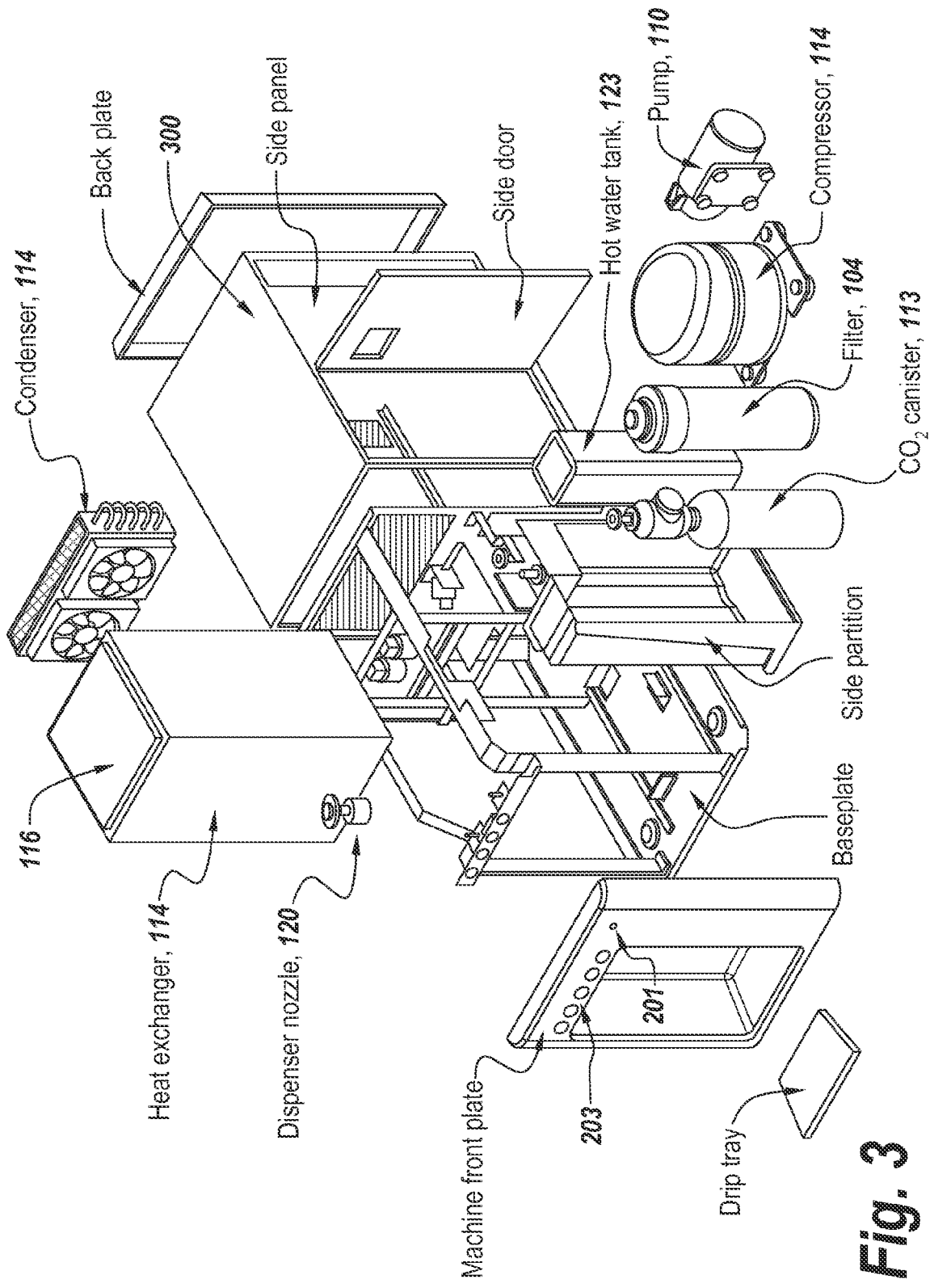
FIG. 3 shows an exploded perspective view of a water dispenser.

The controller 200 may also receive control signals from one or more user interface devices such as pushbutton controllers 203 which may be located on a front panel of the dispenser (see FIG. 3). When a specific push-button 203 on the front panel is pressed for water selection, corresponding valve(s) along with main valve opens to dispense the choice of water. Individual push buttons will dispense unchilled, chilled, and sparkling (carbonated) water. Hot water is dispensed by pressing two hot water switches simultaneously in order to avoid accidental burns as the hot water is typically kept between 85 to 95° C. FIG. 4 illustrates the valve activation corresponding to various user push button selections. In some embodiments, software running on the controller 200 uses generic priority based round robin with interrupts methods to execute commands to control the operation of the dispenser 100.

Optionally, the power of the hot water system can be turned off to save energy. Additional safety measures are taken by incorporating a child safety switch 205, e.g., located on the back of the unit (or some other hard to reach location) that deactivates the two hot water push button switches located on the front.

In some embodiments, the controller 200 is powered by a DC power supply 206 which is in turn powered by a main AC power supply 207 (e.g., plugged into a wall socket). Some components of the dispenser 100 may be powered through the control board, while other components may be powered directly from the main power supply (or another supply, e.g., a supply dedicated to a particular component.

In some embodiments, the controller 200 includes a communications unit that allows remote monitoring and/or control of the dispenser 100. For example, in some embodiments, the controller may be able to detect a malfunction of the dispenser 100 and send a message to a remote location requesting service.

In some embodiments, the controller 200 monitors the usage of the dispenser 100, e.g., to determine when a new filter is required. For example, in some applications, the dispenser 100 may be provided at low or no cost to a user, in return for an agreement to purchase disposables such as replacement filters exclusively from the provider. By monitoring the usage of the dispenser 100, the controller 200 may be able to recognize if the use has exceeded the specifications of an existing filter, and indicate the need for a new filter. The usage data may be stored in a secure memory accessible to the provider but not the user, so that the provider can be sure that the user is living up to its agreement to purchase new filters exclusively from the provider.

In some embodiments, the monitored usage data includes filter life span, dispensing time (i.e., the amount of time that a dispensing function is activated), dispensed volume, statistical usage data, etc.

Some controller functions such as filter life span monitoring, statistical usage data, timed or volume dispensed functions are controlled and dictated by a "Smart Control" peripheral 208. The Smart Control 208 is housed in a USB enclosure and communicates with the master microcontroller on the control board to keep track of filter usage and store/retrieve additional information. In some embodiments, the Smart Control 208 includes an 8-bit microcontroller and serial to USB converter on the board. The serial to USB converter converts communication logic between master microcontroller of the controller 200 and the Smart Control 208. The Smart Control stores (e.g., in a secure and/or encrypted memory) vital operational information and optimizes functions on the control board to execute such instructions. Among such functions, filter life span monitoring, statistical usage data, volume dispensing, timed operations of the unit, maintenance and preventive schedules, troubleshooting and preventive measures in case of malfunctioning, can be listed. Such information can be indicated using LED lights, audible signals, downloadable files, through wireless communications to a server, displayed on a LCD, or similar technologies.

FIG. 3 shows an exploded view of an exemplary embodiment of the dispenser 100. All of the dispenser components, including the gas source 113 are contained within a single enclosure 300. The enclosure 300 includes a base plate, side and top panels, a front plate (including the control pushbuttons 203 and indicators 201), and a back plate. One side panel includes a side door which allows easy user access to the filter 104 and gas source 113 for replacement. A side partition separates the filter 104 and gas source 113 from the rest of the interior of the enclosure, to increase user safety and prevent user tampering. The filter 104 and gas source 113 may be attached/detached using easy to use twist and lock connectors. The gas source 113 may include a flow controller and/or pressure indicator which may be used to adjust the source to proper operating parameters. In some embodiments, the filter 104 is enclosed in a disposable filter cartridge of the type described in U.S. Provisional Patent Application No. 61/500,469 incorporated by reference above.

In general, the enclosure 100 may have an advantageous form factor, e.g., corresponding to a standard appliance sizes or standard cabinet sizes used in kitchens. For example, in some embodiments, the enclosure 100 may have a size corresponding to one of the following standard appliance sizes.

| Appliance | Height Range | Width Range | Depth Range |
| --- | --- | --- | --- |
| Cooktop | 2-3" | 12-48" | 18-22" |
| Dishwasher | 33-35" | 23-24" | 23-26" |
| Microwave | 13-18" | 21-23" | 14-22" |
| Range, floor model | 35-36" | 19-40" | 24-26" |
| Range, w/ upper oven | 61-68" | 30-40" | 25-28" |
| Range, drop-in | 23-24" | 23-24" | 22-25" |
| Range hood | 5-8" | 24-72" | 12-72" |
| Refrigerator | 55-69" | 24-36" | 26-33" |
| Trash Compactor | 33-35" | 12-15" | 18-24" |
| Wall oven, single | 23-25" | 21-24" | 21-23" |
| Wall oven, double | 39-50" | 21-24" | 21-23" |
| Wall oven with broiler | 38-40" | 21-24" | 21-23" |

In some embodiments, the enclosure fits within a cube having a side length of 5 meters or less, 4 meters or less, 3 meters or less, 2 meters or less, 1 meter or less, 0.5 meters or less, 0.25 meters or less, or smaller, e.g., in the range of 0.25 meters-5 meters or any sub-range thereof.

The controller 200 may be located at any suitable position within the enclosure, and may be connected to various components of the dispenser 100 using wired or wireless connections.

Figure 5:
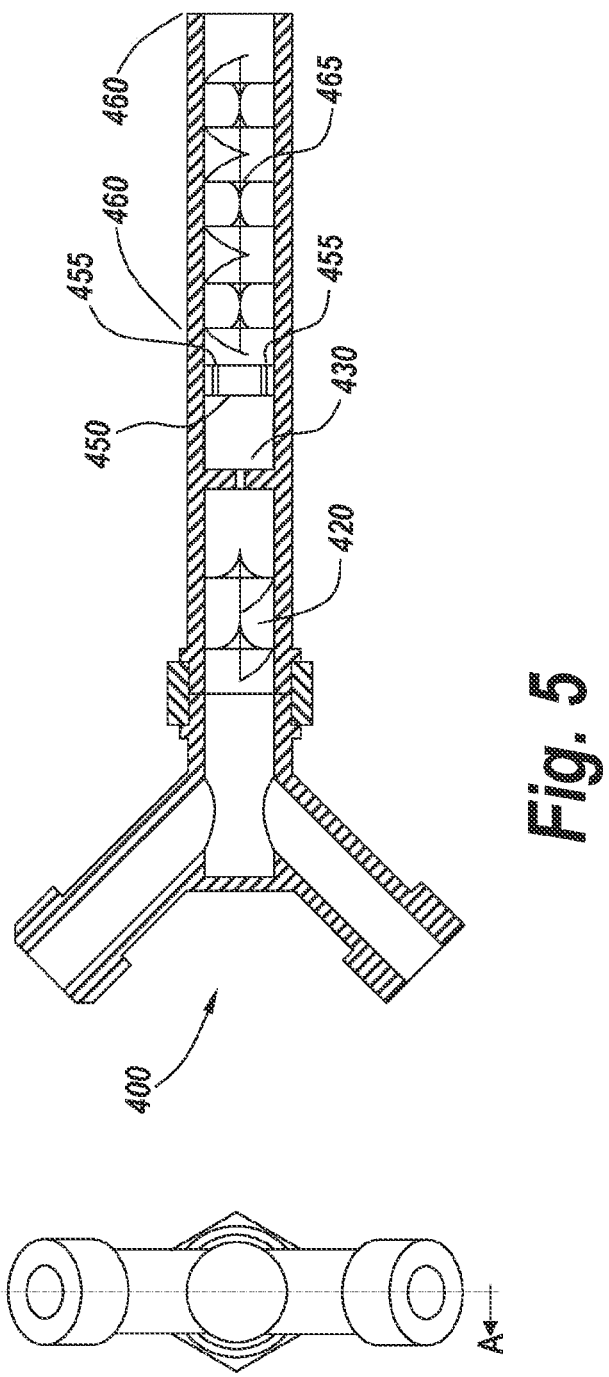
FIG. 5 illustrates an in-line carbonator. The left panel shows a head on view of the carbonator inlet, and the right panel shows a cross sectional side view.
Figure 5:
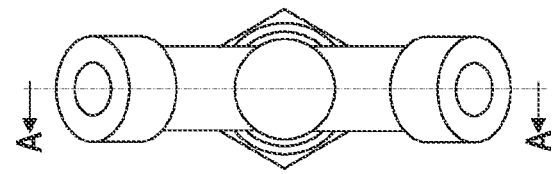

An exemplary embodiment of carbonator 108 is shown in FIG. 5. The carbon dioxide and water are brought into contact via a Y-shaped inlet manifold 400 having two inlets, one for a carbon dioxide supply the other for a water supply. In this embodiment, the two inlets are identical and interchangeable. The manifold used to introduce the carbon dioxide and water into the collision chamber can be of any other suitable arrangement, for example, T-shaped or F-shaped. As a further example, the supplies could be provided by a concentric tube within a tube structure. The Y-shaped manifold, or other shapes depending on their need, could also include an initial divider to prevent one stream going into the other supplies' inlet. Furthermore, standard backflow preventers can also be used within the inlets or upstream of the inlets. Furthermore, the flow of water and carbon dioxide can also be controlled by valves or regulators at the entrance of the manifold.

The incoming water pressure (e.g., controlled by pump 110) affects the flow and pressure through the remainder of the system. A minimum pressure of 10 psi is sufficient to achieve a satisfactory flow rate and carbonation. A flow rate in the range of 0.1 gpm to 1.5 gpm has been found to be particularly advantageous, but even higher flow rates are also acceptable.

The carbon dioxide is provided at a pressure between 45 psi and 125 psi. Preferably, the carbon dioxide pressure provided at the Y-shaped inlet manifold is kept close to the water pressure provided at the Y-inlet manifold.

In the embodiment of FIG. 5, flow developers 420 are provided within the flow path after the inlet manifold. The flow developers are used in order to prevent a stratified, or laminar, carbon dioxide/water flow. Instead, the flow developers create a substantially dispersed flow, typically an annular-dispersed flow. The embodiment of FIG. 5 uses passive flow developers comprised of helically shaped elements 420. Other passive directional mixers capable of dispersing the carbon dioxide and water flow would also be suitable, such as protrusions from the conduit wall. Alternatively, active mixers, such as spinning blades can be used. As shown in FIG. 5, the flow developing elements 420 can be arranged in series to achieve the desired level of dispersion. The flow developing elements can similarly be used in combinations of different types, including mixed passive and active elements.

The dispersed stream of carbon dioxide/water is then accelerated by forcing it through a restrictor/accelerator 430.

As is well known in the art, passing a fluid flow through a restriction will result in an accelerated flow, which arises due to the principle of mass conservation. The restrictor/accelerator is used to easily increase the kinetic energy of the carbon dioxide/water stream prior to the collision. Thus, for a given inlet speed and pressure, the energy of the carbon dioxide/water flow exiting the restrictor/accelerator will be increased without requiring an expensive pumping apparatus. The increased kinetic energy results in a higher momentum change upon impact with the collision surface 450, thereby increasing the pressure achieved in the corresponding pressure zone, which results in improved solubilization at the collision site. The restrictor/accelerator 430 is a simple orifice. However, more complex engineered structures can also be employed.

It has been observed that acceptable solubilization in accordance with this disclosure is achieved with a sudden contraction or a converging restriction when it is designed to have a loss coefficient between 0.1 to 0.44, preferably about 0.41. For a sharp-edged orifice such as restrictor/accelerator 430 in FIG. 5, acceptable solubilization occurs with a loss coefficient larger than 10, preferably 60.

In addition, the size of the restrictions can be varied to achieve high quality carbonated water. The ratio of the inlet radius to the contracted area radius is optimally designed to be in the range between 1 (no restriction) and 20 (max restriction);

In the very neighborhood of the moving streamlines of carbon dioxide surrounded by water passing the restrictions, each stream acquires a certain amount of momentum and related kinetic energy. These streamlines, in turn, impart some of its momentum to the adjacent layer of solution causing it to remain in motion and accelerate further in the flow direction. The momentum flux, in this case, is in the direction of the negative velocity gradient. In other words, the momentum tends to go in the direction of decreasing velocity; thus the velocity gradient can be considered as the driving force for momentum transport.

When the carbon dioxide/water mixture is flowing through the narrow passage (example: the orifice) parallel to the surfaces, the velocity of the mixture in the flow direction decreases as approached to the surfaces. This velocity difference between the adjacent layers of the carbon dioxide and water results in a velocity gradient. By random diffusion of molecules occurring between faster moving layers of molecules and the slower adjacent layer, the momentum is transferred in the transverse direction within the narrow passage from the faster to the slower moving layer.

After leaving the restrictor/accelerator 430 the accelerated stream of carbon dioxide/water mixture, having reached a much higher kinetic energy, collides with stationary solid wall 450.

The solid wall 450 can be of any shape or structure, preferably the wall is placed perpendicular to the carbon dioxide/water stream. The wall should be placed sufficiently close to the restrictor accelerator so that the increased kinetic energy achieved is not substantially lost due to frictional forces prior to reaching the wall 450. It has been found that acceptable results are achieved if the solid wall 450 is placed from approximately 0.1 inches and 2.0 inches from the restrictor/accelerator, preferably 0.5 inches.

Net forces generated through the collisions with the wall, i.e., the pressure energy densities ("PED") in the pressure zone, between a range of −40 foot-pound/$cm^3$ to 5 footpound/$cm^3$ have been found to produce acceptable solubilization. These forces can be created through adjusting the relative relationships of the geometries of the restrictor/accelerator, the conduit, the level of mixture achieved, and the starting pressure of the inlet carbon dioxide and water streams.

The wall 450 further has outlet passages 455 to allow the further flow through the system. As shown in FIG. 4 this further connects to the inlet of retention network 460. The retention network can simply be a plain conduit. Retention network 460 of FIG. 5 is comprised of static helical mixers 465. Other types of packing materials, such as raschig rings, could also be used. Further, any of the static or active mixing elements described as suitable for creating a dispersed flow could be put to use in the retention network to further enhance contact and solubilization of carbon dioxide in water.

The length and configuration of the retention network and the size of the packing materials within the retention network can be modified to obtain different levels of carbonation to dispense carbonated water with different levels of solubilization. Generally, longer retention networks, preferably up to 10 inches, raise the carbonization level by allowing more time for mixing contact between the carbon dioxide and water in the fluid stream. Longer retention networks also increase the pressure at the outlet passages of the collision chamber 455, which increases the pressure within the collision chamber and stabilizes the entire flow rate.

The length and composition of the retention network can also be used to obtain a desired pressure at the outlet of the retention network. In general, the pressure drop achieved through the retention network is directly proportional to the ratio between the length and the diameter ("L/D"). Therefore, one can achieve similar pressure drops, flow and mixing characteristics by changing either the length or the diameter or both of the retention network. Packing materials also affect the pressure drop obtained. Generally, smaller size packing materials and longer retention networks increase the pressure drop.

Figure 6A:
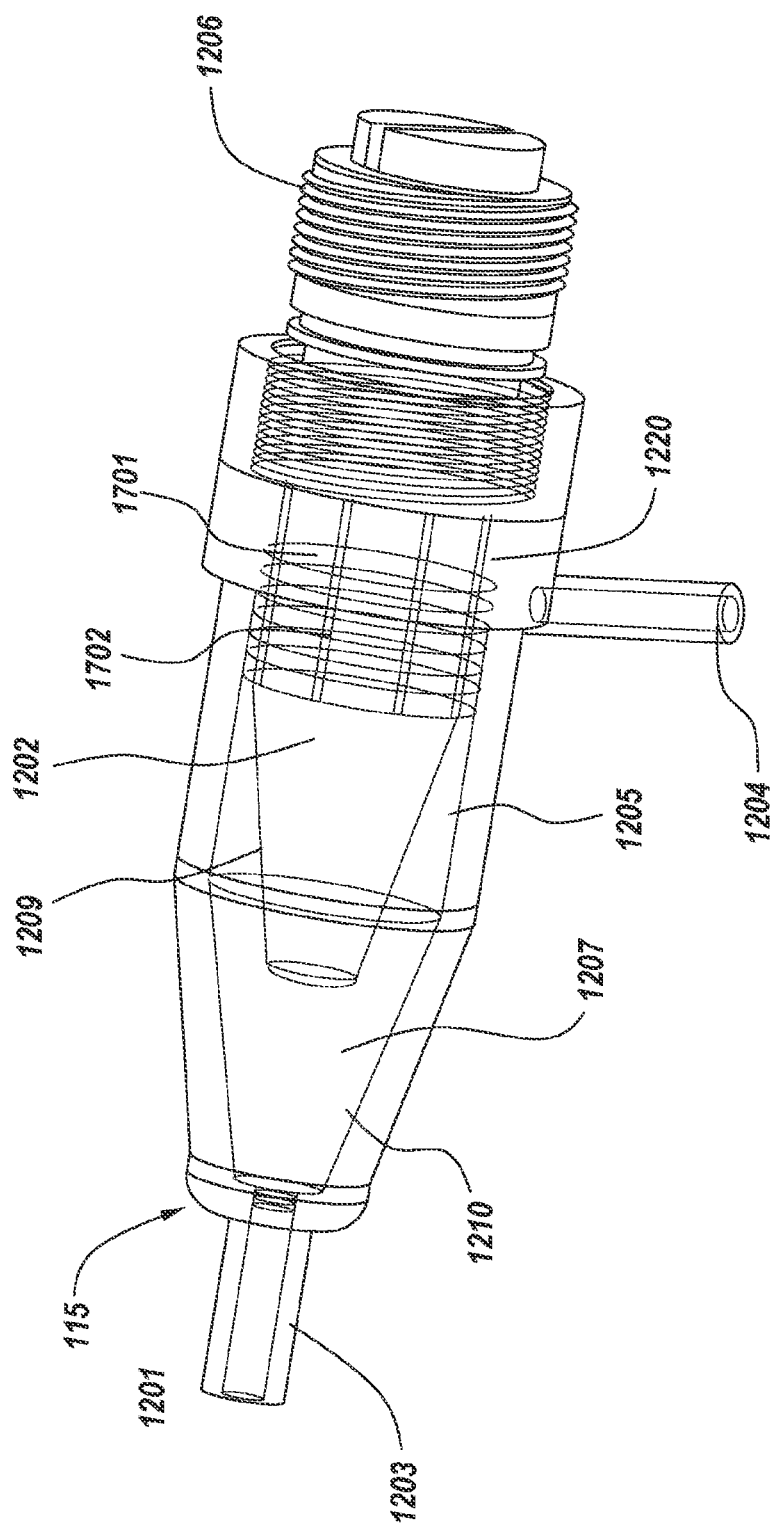
FIG. 6A shows an exploded view of a flow compensator.
Figure 6B:
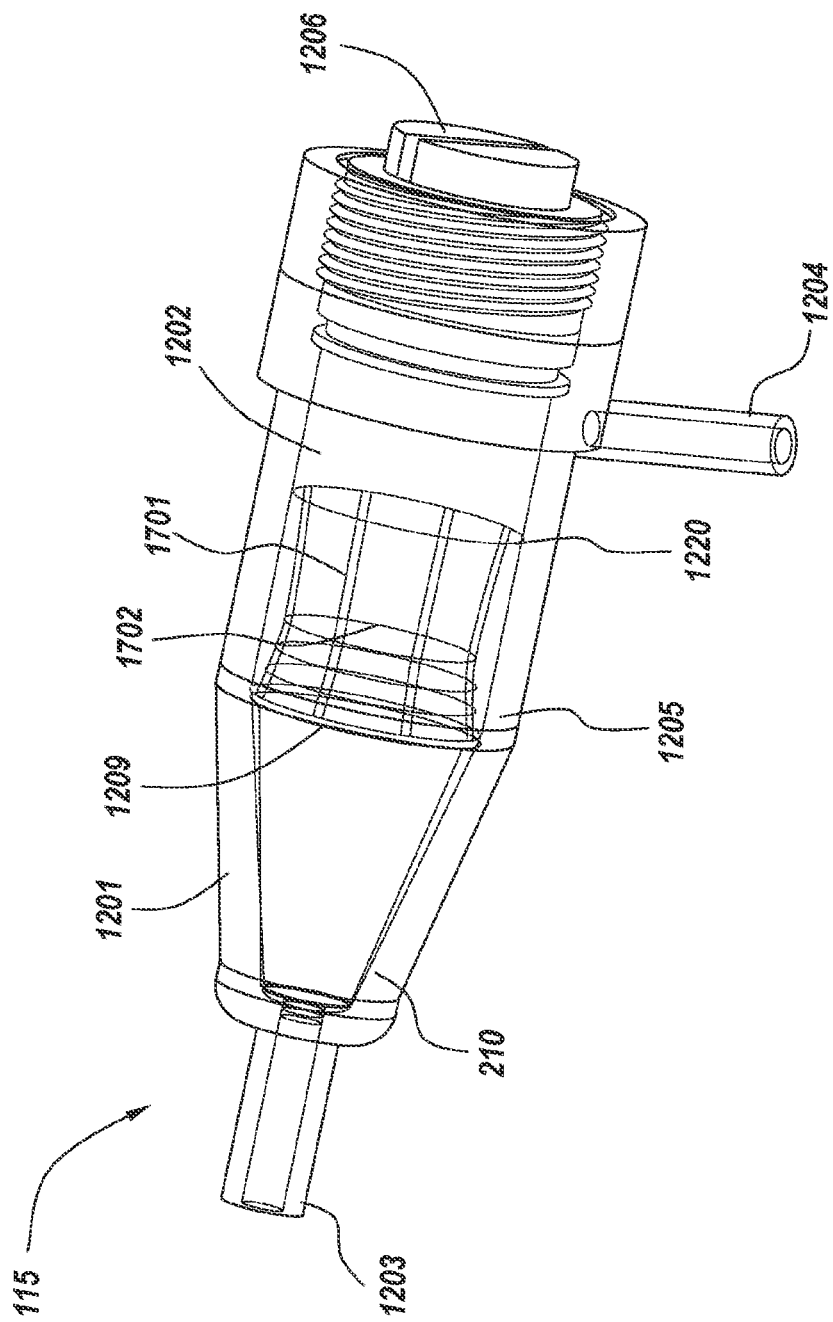
FIG. 6B shows an assembled view of a flow compensator.

FIGS. 6A and 6B illustrate an exemplary embodiment of the flow compensator 115. FIG. 6A is an exploded view and FIG. 6B is an assembled view. The flow compensator 115 includes a housing 1201 and an insert member 1202. The housing 1201 includes an inlet port 1203 and an outlet port 1204. As shown, the inlet and outlet ports 1203, 1204 include quick connect stem portions to facilitate connections with external devices (e.g., a connection between the output of carbonator 108 and the inlet port 1203). Alternatively, threaded portions can be used. In various embodiments any other type of (preferable fluid tight) connectors may be used.

A conduit 1205 extends through the housing 1201 between the inlet port 1203 and the outlet port 1204. When assembled, a portion of insert 1202 is positioned in the conduit 1205. The insert 1202 acts to seal the conduit 1205 such that a flow of carbonated water into the inlet port 1202 flows through the conduit along the insert 1202 and is output through the outlet port 1204.

The flow compensator 115 includes a facility 1206 for adjusting the position of the insert 1202 inside the conduit 1205. As shown, the facility 1206 is made up of a threaded attachment between an end of the insert 1202 and a corresponding threaded hole in the housing 1201. The end of the insert 1202 includes a notch that allows the insert 1202 to be turned (e.g., using a screw driver) to advance or retract the insert 1202 into or out of the conduit 1205. In various embodiments, any other type of adjustable attachment may be used. The facility 1206 allows for adjustment of one or more properties (e.g., flow rate, turbulence, etc.) of the regulated flow output from the outlet port 1204. The facility 1206 may allow for adjustment of the position of the insert 1202 while maintaining the fluid tight seal between the insert and housing. For example, as shown two O-rings 1211 (e.g., made of an elastomeric material such as rubber material) on the insert 1202 form a slidable seal between the insert and the housing.

As shown the conduit 1205 extends along a longitudinal axis (indicated with a dotted line) from a proximal end near the inlet port 1203 to a distal end near the outlet port 1204. The conduit 1205 includes a tubular passage 1207 disposed about and extending from the inlet port 1203 along this longitudinal axis to a back wall formed by when the insert 1202 is attached to the housing 1201. The outlet port 1204 is positioned distal from and transverse to (as show at a right angle to) the inlet port 1203. The outlet port 1204 is in fluid communication with the tubular passage 1207.

When assembled, the insert 1202 extends along the longitudinal axis from a proximal end located within the conduit 1205, to a distal end that extends outside of the housing 1201. The insert 1202 includes a tapered portion 1209 that is narrower towards the proximal end of the insert (i.e., the end of the insert facing the inlet port 1201) and wider towards the distal end of the insert. The conduit 1205 may include a correspondingly tapered shaped portion 1210, such that conduit and insert cooperate to form a narrow conical channel. This conical channel has a cross sectional area (taken along the direction transverse to the longitudinal axis) which is smaller than the cross sectional area of the portion of the conduit 1205 adjacent the inlet port. In some embodiments, the cross sectional area may be reduced by a factor of 2, 3, 4, 5, 10, 100, etc or any other desirable amount. By adjusting the position of the insert 1202 using facility 1206, the cross sectional area of the conical channel can be varied to control the rate of flow through the compensator and/or other flow properties.

The surface of the tapered portion 1209 and the surface of the correspondingly shaped portion 1210 of the conduit 1205 may be smooth. As described in greater detail below, this smooth narrow channel promotes laminar flow through the compensator 115, thereby reducing the turbulence of the flow.

The surface of cylindrical portion 1220 includes alternating ribs 1701 and channels 1702 extending in a direction along the longitudinal axis. The depth of the channels 1702 increases with increasing distance from the tapered portion 1209 of the insert 1202 to a maximum depth, and then decreases. Accordingly, the cylindrical portion 1220 has an hourglass shape with a waist having a minimum diameter from the longitudinal axis. The ribs 1701 separate adjacent channels 1702.

The ribs 1701 and channels 1702 operate to decrease the magnitude of the velocity of the flow through the channels 1702. This slowing may provide a longer contact time and a larger contact surface area between the carbon dioxide and water in the flow resulting in a better carbonation level and a stabilized flow. In various embodiments, the local magnitude of the flow velocity through the channels 1702 at their deepest point will be less than 50%, 25%, 10%, etc. of the velocity of the flow as it enters the channels. In general, deeper channels will have a more dramatic slowing effect.

The channels 1702 further operate to reduce the turbulence of the flow (i.e., providing a laminar flow) and maintain a consistent pressure. For example, in some embodiments, the flow through the channels 1702 along a significant portion (e.g., at least 50%, at least 60% and least 70% at least 80%, at least 90% or more) of the cylindrical section 1220 of the insert 1202 may be characterized by a Reynolds number of 2500 or less, 2000 or less, 1500 or less, 1000 or less, 500 or less, or even smaller. The pressure for the corresponding flow along the corresponding portion of the insert 1202 may vary by less than e.g., 25%, 10%, 5%, 1%, or less than the average pressure. This type of flow advantageously prevents the separation of carbon dioxide and water, thereby helping to maintain the level of carbonation.

Figure 7A:
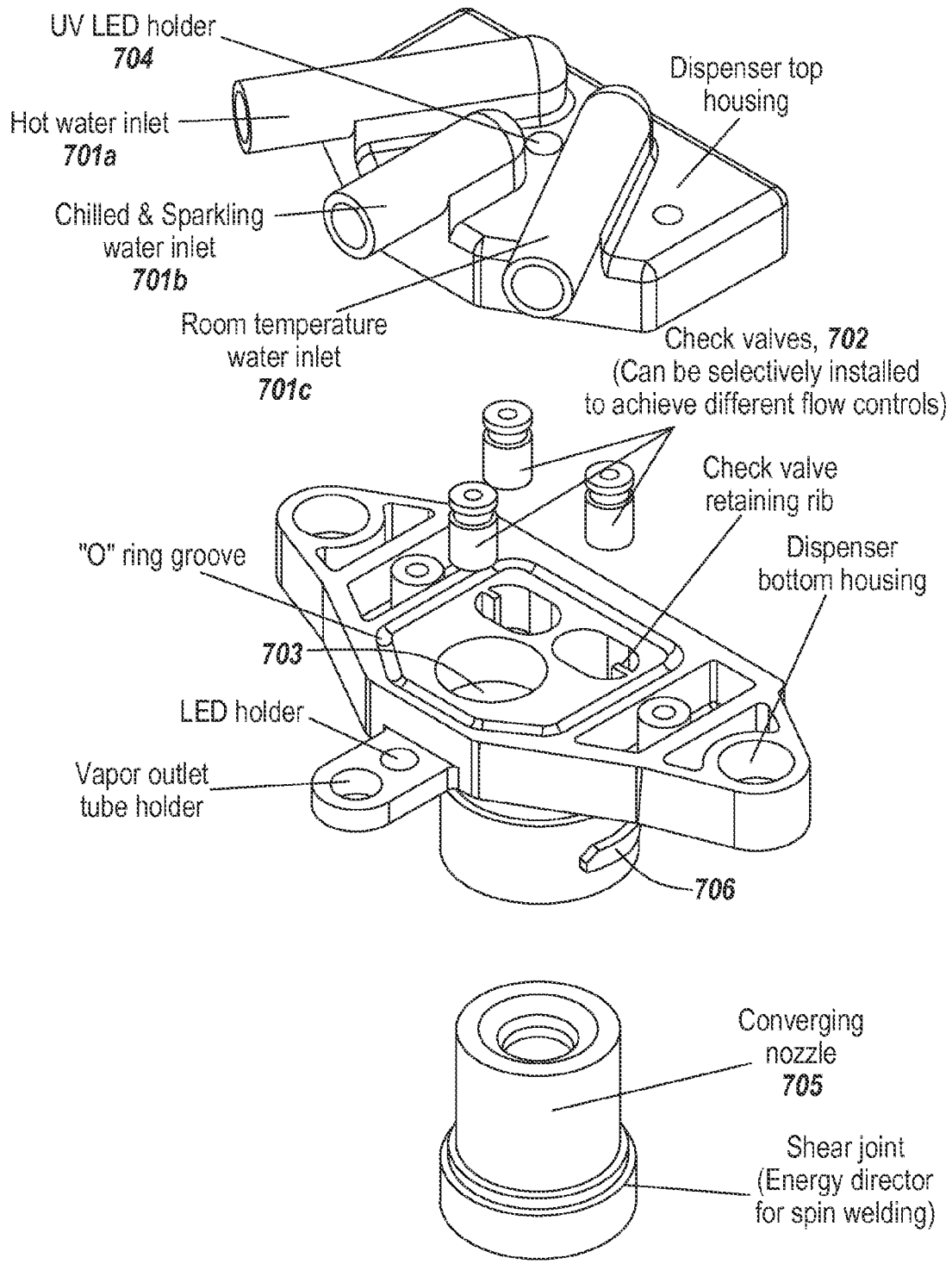
FIG. 7A shows a top down perspective exploded view of a dispenser nozzle device.
Figure 7B:
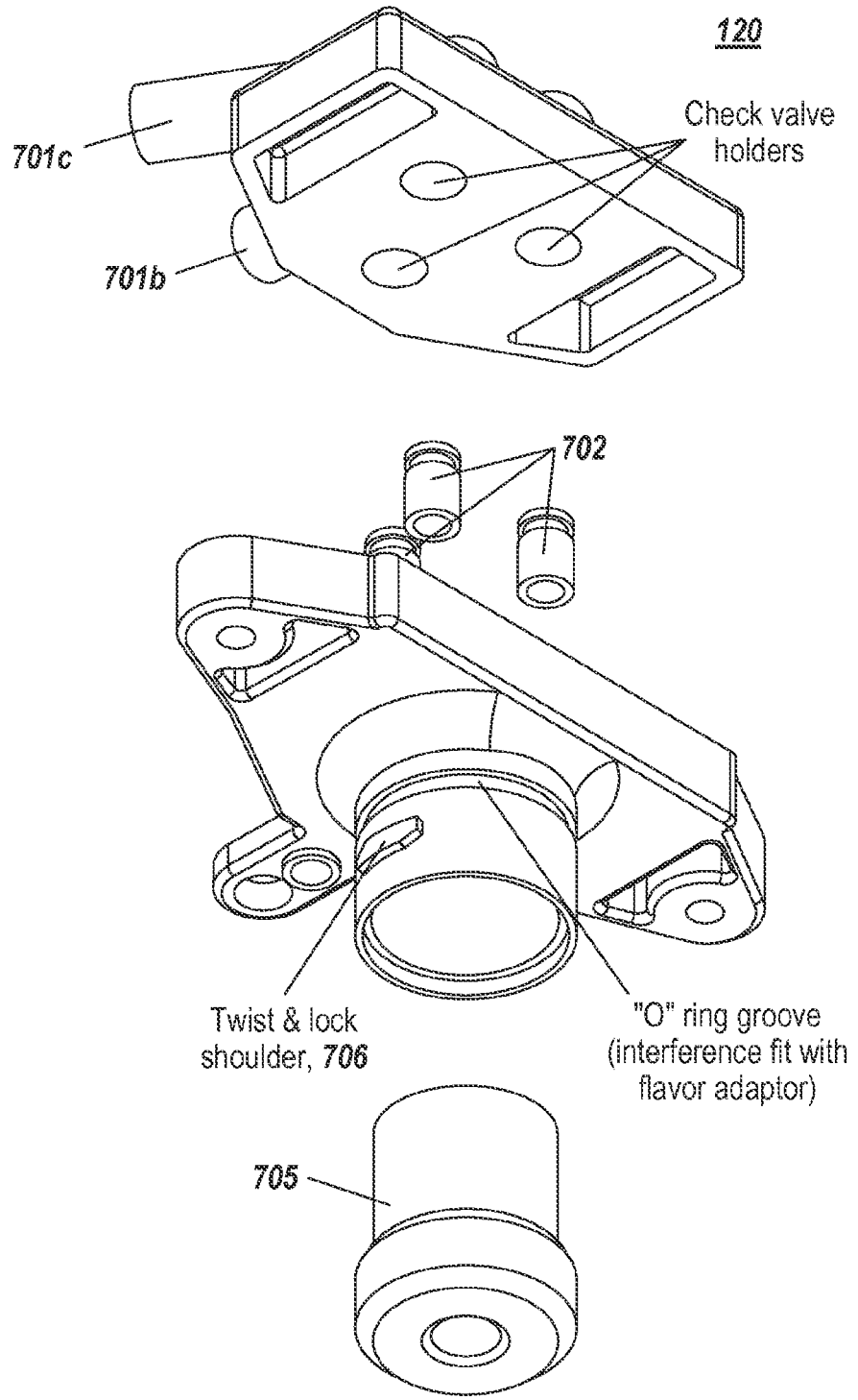
FIG. 7B shows a bottom up perspective exploded view of a dispenser nozzle device.

FIGS. 7A and 7B show exploded views of an exemplary embodiment of the dispenser nozzle unit 120. The dispenser nozzle includes three inlets 701a, 701b, and 701c which receive water from the hot, chilled, and unchilled water lines, respectively. In some embodiments, the nozzle unit 120 includes additional inlets, e.g., to allow flavor content (e.g., a flavored syrup) to be mixed with the water flow.

The inlet water passes through a check valve 702 which prevents back flow into an interior chamber 703 of the nozzle unit 120. The chamber may be shaped to allow the expansion of the flow from the inlets, to control the flow rate and to reduce spattering and interrupted flow. Water exits the chamber 703 through a nozzle 705 (e.g., a converging nozzle). The chamber 703 may include one or more vapor exhaust ports to allow gas or vapor displaced by the inflow of water to exit the chamber. The converging nozzle may include a check valve similar to 702.

In some embodiments, the nozzle unit 120 includes a holder for the UV light which directs light onto the water flow stream to disinfect or otherwise clean the water. When ultraviolet energy is absorbed by the reproductive mechanisms of bacteria and viruses in the water, the genetic material or the organisms (DNA/RNA) is rearranged and they can no longer reproduce, reducing or eliminating the risk of disease. UV-rays are energy-rich electromagnetic rays that are found in the natural spectrum of the sunlight. They are in the range of the invisible short wave light having a wavelength ranging from 100 to 400 nm. The UV light may provide UV doses in the range of, e.g., 1000-500,000 microwatt seconds per square centimeter, or any suitable subrange thereof. Such doses have been recognized as effective for reducing or eliminating water born contaminates.

In some embodiments, the nozzle unit 120 includes a facility 706 (as shown a twist and lock connector with an O-ring groove) which allows for attachment of one or more peripheral devices. The peripheral device may include a device for mixing flavor content with the dispensed water stream, e.g., as described in U.S. Provisional Patent Application No. 61/500,500, incorporated by reference above.

In various embodiments, nozzle unit 120 may include any of the devices described in Provisional Patent Application No. 61/500,440 incorporated by reference above.

Figure 11A:
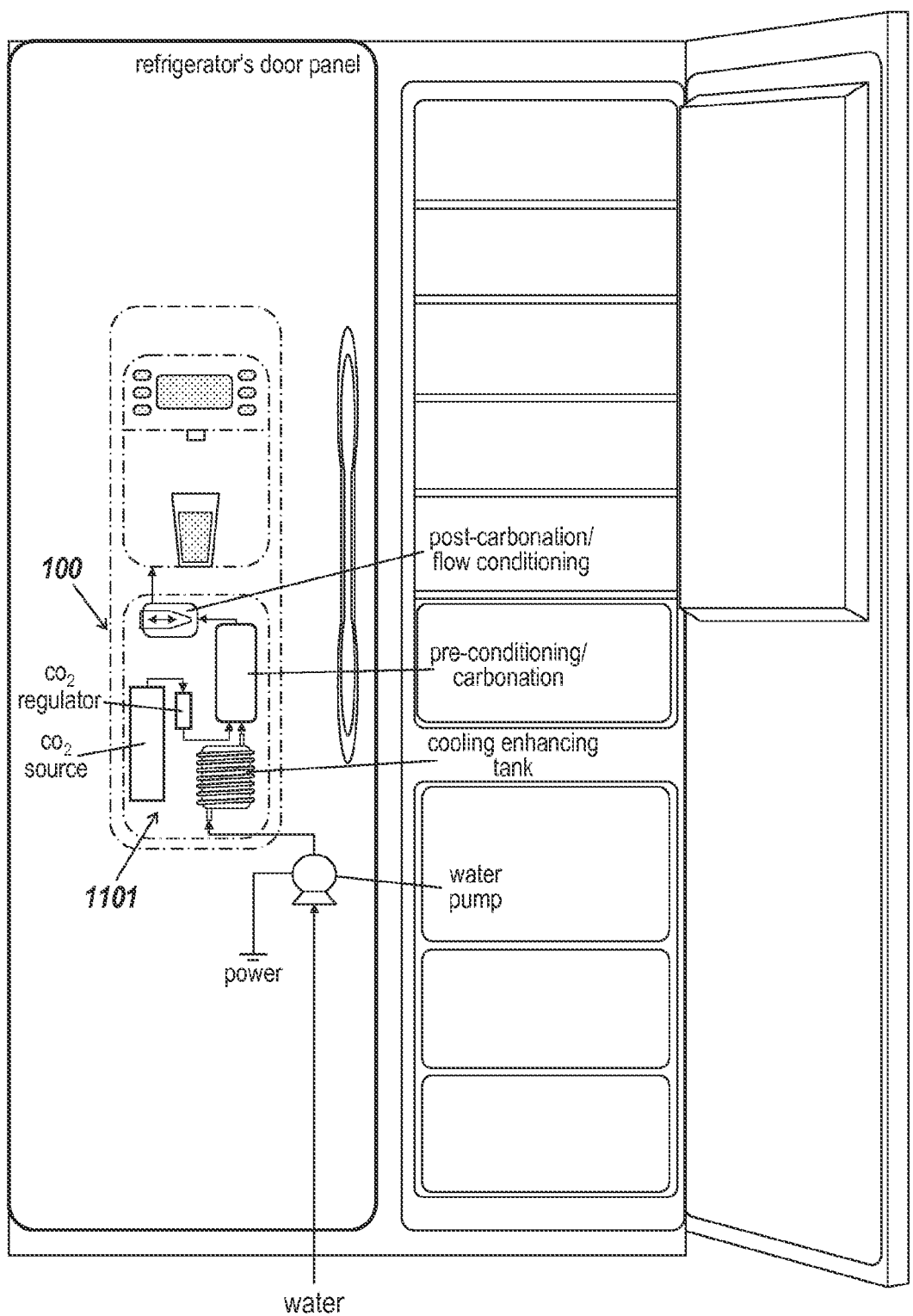
FIG. 11A shows a refrigerator with an integrated carbonated water dispenser.
Figure 11B:
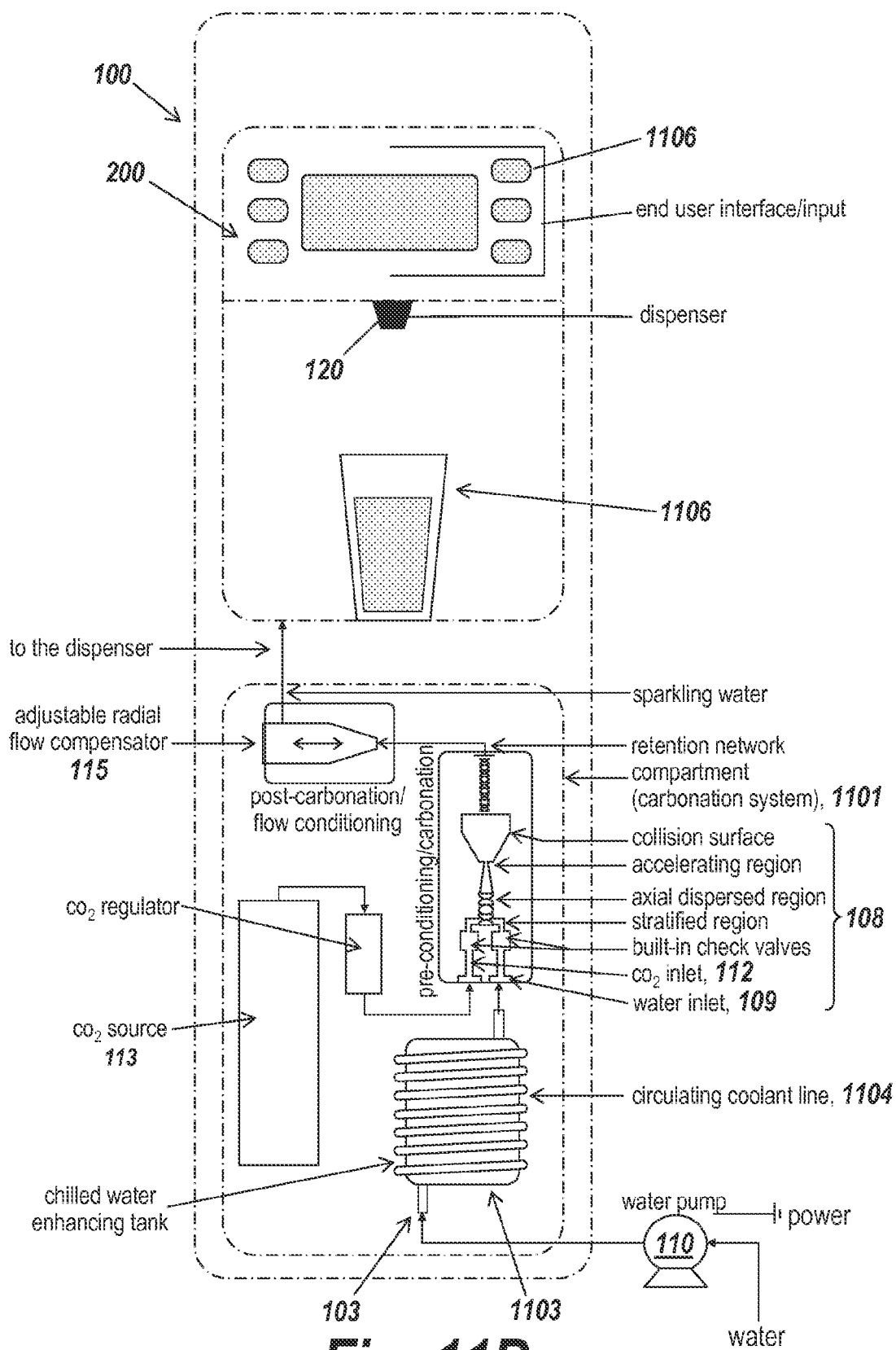
FIG. 11B shows a detail of a door panel for the refrigerator of FIG. 11A.

FIGS. 11A and 11B show an embodiment of the dispenser 100 of the type described herein integrated in a refrigerator 1100. The refrigerator may be of any type known in the art. As shown, the refrigerator is in a side by side configurations with two doors. The water dispenser 100 is integrated in the left side door, with components of the dispenser contained in a compartment 1101.

The components of the dispenser 100 are substantially similar to those described above with respect to a stand-alone dispenser. As shown, the unchilled and heated water lines are omitted, but, in other embodiments, it one or both may be included.

Water from the main inlet 101 is directed through a main inlet valve 103. The main inlet valve 103 may be controlled (e.g., opened or closed) by a controller 200 (e.g. of the type shown in FIG. 2). Water from the main inlet valve flows through a filter (not shown) and is directed to a chilled and sparkling water line 105.

A carbonator water inlet valve 109 is controlled by the controller 200 to selectively allow a flow of water from the filter to the carbonator 108. Optionally, the chilled water line 105 may include a water pump 110, which pumps water to the carbonator 108 (e.g., at a desired pressure level). The water pump 110 may be controlled by the controller 200. In other embodiments, the desired pressure level may be provided by any other suitable arrangement, including the use of a gravity feed or using pressure from an external source (e.g., the pressure of the building plumbing connected to the main inlet).

The chilled water line may include a tank 1103 surrounded by a coolant line 1104 used to chill the water. In some embodiments, the coolant line 1104 may be a component of the main cooling system of the refrigerator 1100, as described in greater detail below.

A carbonator gas inlet valve 112 is controlled by the controller 200 to selectively allow the flow of a carbonating gas (as shown carbon dioxide) from a pressurized gas source 113 (e.g., a canister with a regulator, as shown). The gas source 113 may be located within the refrigerator 1100 (as shown), or may be located externally. Some embodiments may include a regulator or pump to control the pressure of the carbonating gas delivered to the carbonator. 108.

When the main inlet valve 103, carbonator water inlet valve 109 and carbonator gas inlet valve 112 are open, water and gas flow to the carbonator that outputs carbonated water. When the main inlet valve 103 and carbonator water inlet valve 109 are open, but carbonator gas inlet valve 112 is closed, only water flows to the carbonator. Accordingly, no carbonation occurs, and the carbonator outputs chilled still water.

Water output from the carbonator may flow through a flow compensator 115 that operates to condition the flow from the carbonator, as described in detail above.

The dispenser nozzle unit 120 receives water from the water line 105 and outputs the water from a single nozzle. In some embodiments, multiple nozzles may be used. The door includes a dispensing area 1105 where a beverage receptacle 1108 (e.g. a cup, bottle, glass, etc.) can be placed to receive a beverage dispensed from the dispenser nozzle 120.

The controller 200 may receive control signals from one or more user interface devices such as pushbutton controllers 1106 which may be located on a front panel of the refrigerator. When a specific push-button 1106 on the front panel is pressed for water selection, corresponding valve(s) along with main valve opens to dispense the choice of water. Individual push buttons will dispense chilled still and chilled sparkling (carbonated) water.

As will be understood by one skilled in the art, the dispenser 100 in the refrigerator 1100 may include any of the components or features described above with respect to stand-alone dispensers.

Figure 11C:
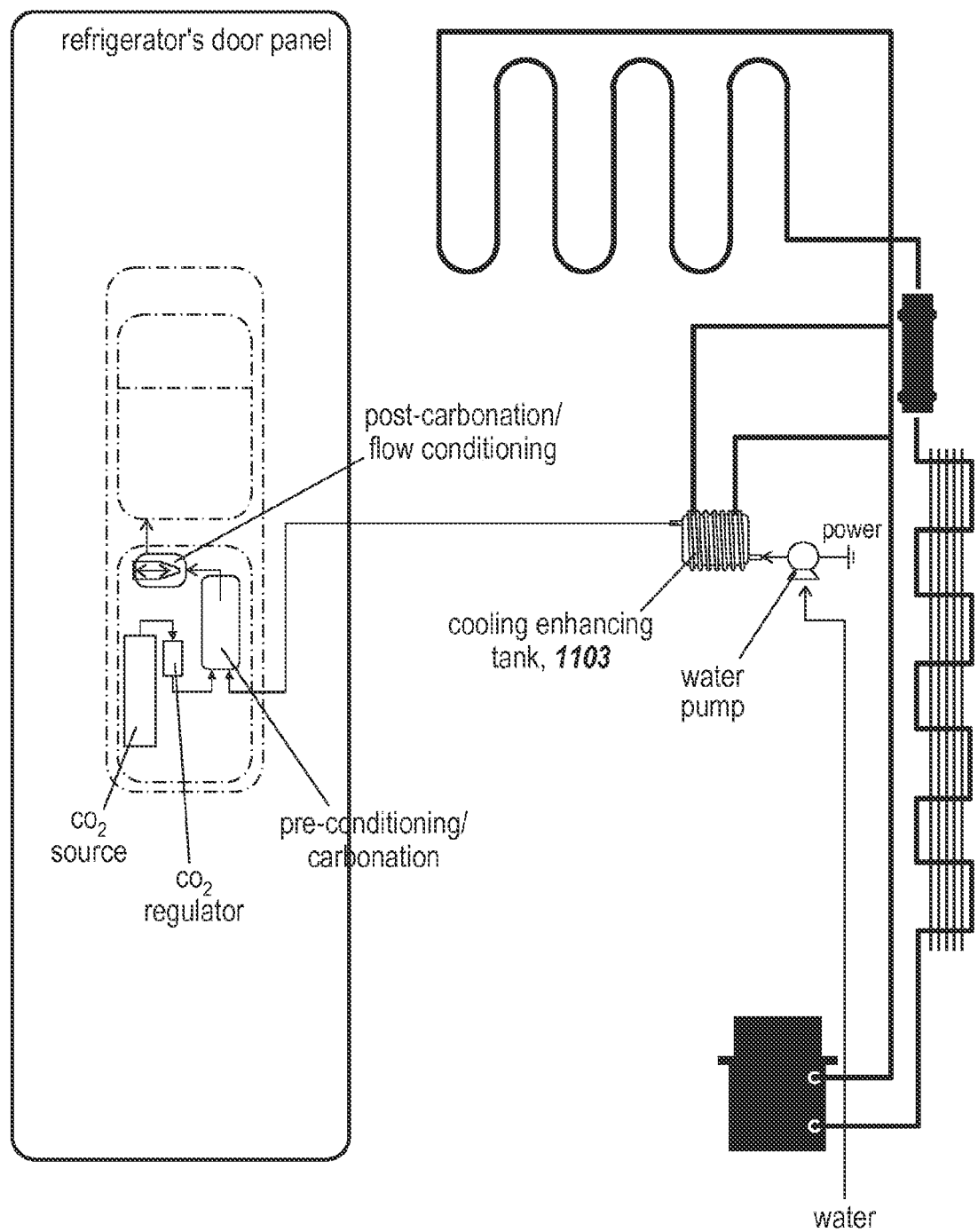
FIG. 11C shows a variation of the embodiment of FIGS. 11A and 11B where the tank 1103 is located on the rear side of the refrigerator, in closer proximity to the components of the primary refrigeration system of the refrigerator.

As will be understood by once skilled in the art, variations on the above described refrigerator integrated dispenser system are possible. For example, FIG. 11C shows a variation of the embodiment of FIGS. 11A and 11B where the tank 1103 is located not in the door, but on a side of the refrigerator, in closer proximity to the components of the primary refrigeration system of the refrigerator. As described below, this configuration is convenient when the primary refrigeration system is used to cool water in the tank 1103 used by the dispenser 100. In particular, it removes the need for running tubing from the main body of the refrigerator to the door. In other embodiments, the tank 1103 may be positioned in the door, with chilling of the dispensed water accomplished through heat transfer (e.g., convective heat transfer) with a freezer compartment of the refrigerator.

Figure 12A:
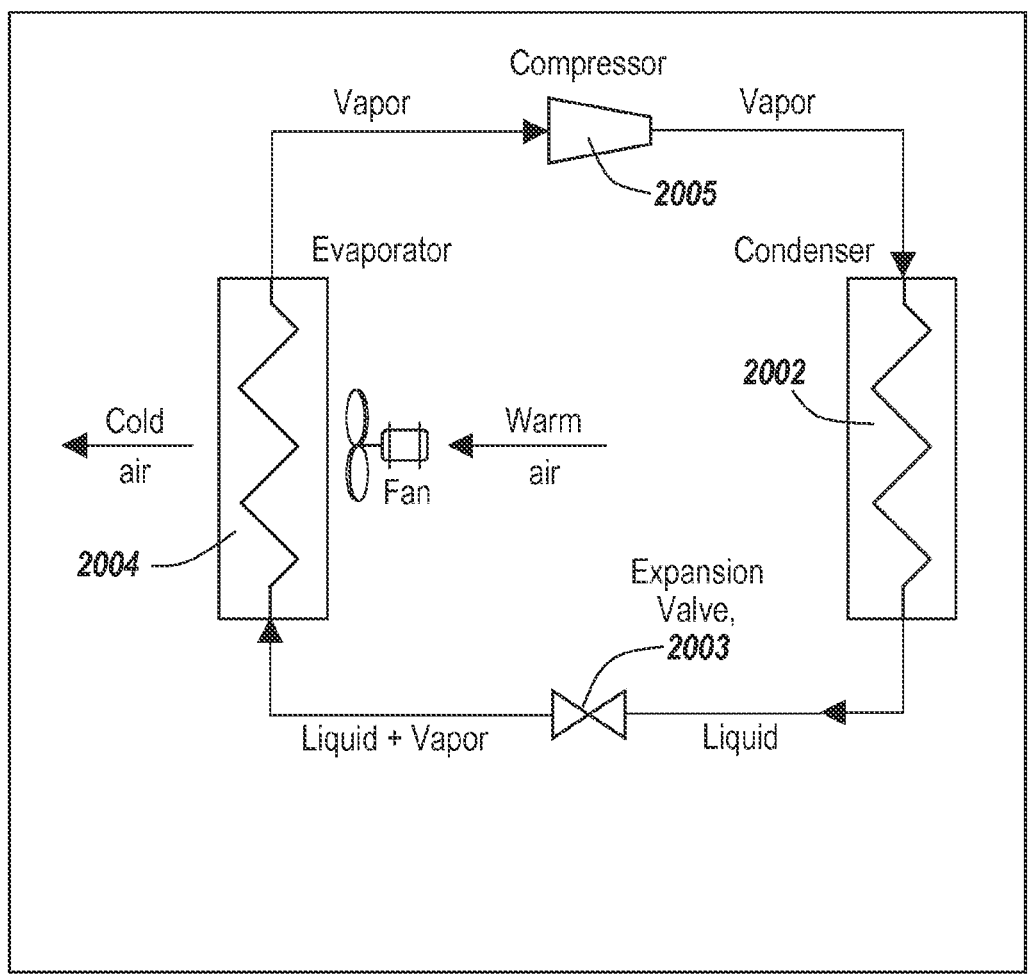
FIG. 12A is an illustration of a refrigeration system for a refrigerator.

As noted above, in some embodiments, water in the dispenser 100 may be cooled using a component of the main cooling system of the refrigerator 1100. For example, FIG. 12A shows an exemplary embodiment of a vapor-compression cooling system 1200 for the refrigerator. The vapor-compression system 1200 uses a circulating liquid refrigerant (of any type known in the art) as the medium that absorbs and removes heat from the space to be cooled (the interior of the refrigerator 1100) and subsequently rejects that heat elsewhere (the external environment).

As shown, the system 2000 is a single-stage vapor-compression system including a compressor 2001, a condenser 2002, a thermal expansion valve 2003 (e.g., a capillary tube expansion valve), and an evaporator 2004.

Figure 12B:
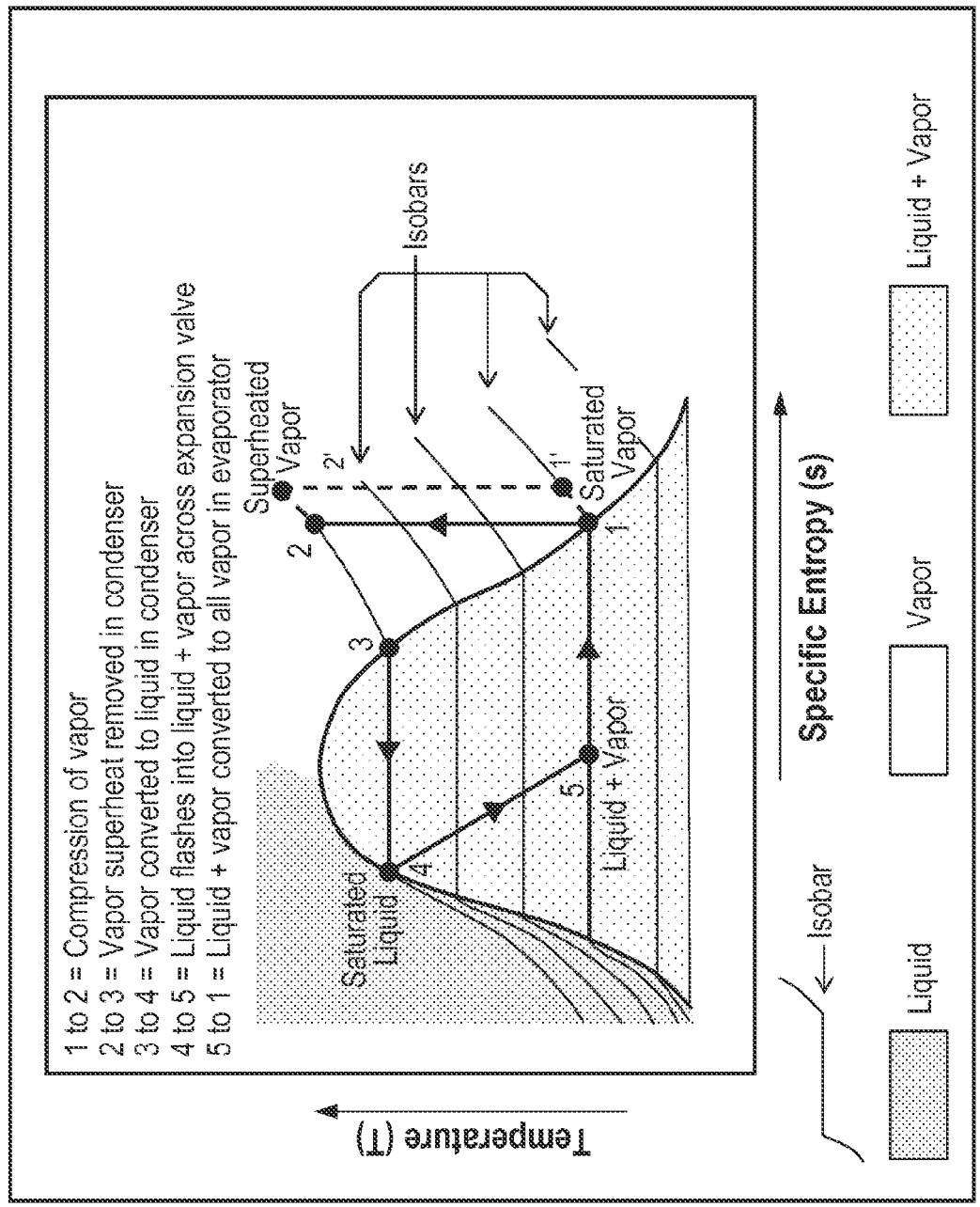
FIG. 12B is an illustration of the thermodynamic cycle of the refrigeration system of FIG. 12A, superimposed on a temperature entropy diagram from the refrigerant used in the system.

FIG. 12B shows the thermodynamic cycle of the system 2000 superimposed on a temperature entropy diagram for the refrigerant fluid. The solid line shows the cycle for the system in the absence of the dispenser 100. The dotted line shows a modification of the cycle to accommodate cooling of water in the dispenser 100.

Circulating refrigerant enters the compressor 2001 in the thermodynamic state known as a saturated vapor and is compressed to a higher pressure, resulting in a higher temperature as well (process 1-2). The hot, compressed vapor is then in the thermodynamic state known as a superheated vapor. That hot vapor is routed through the condenser 2002 where it is cooled and condensed into a liquid, e.g., by flowing through a coil or tubes with cool water, air, or other fluid flowing across the coil or tubes (process 2-3-4).

The condensed liquid refrigerant, in the thermodynamic state known as a saturated liquid, is next routed through the expansion valve 2003 where it undergoes an abrupt reduction in pressure (process 4-5). That pressure reduction results in the adiabatic flash evaporation of a part of the liquid refrigerant. The auto-refrigeration effect of the adiabatic flash evaporation lowers the temperature of the liquid and vapor refrigerant mixture to where it is colder than the temperature of the enclosed space to be refrigerated (typically colder than the freezing point of water).

The cold mixture is then routed through the coil or tubes in the evaporator 2004. A fan circulates the warm air in the enclosed space across the coil or tubes carrying the cold refrigerant liquid and vapor mixture. That warm air evaporates the liquid part of the cold refrigerant mixture. At the same time, the circulating air is cooled and thus lowers the temperature of the enclosed space to the desired temperature (isothermal process 5-1). The evaporator is where the circulating refrigerant absorbs and removes heat that is subsequently rejected in the condenser and transferred elsewhere by the water or air used in the condenser.

To complete the refrigeration cycle, the refrigerant vapor from the evaporator is again a saturated vapor and is routed back into the compressor 2001. Conventionally, the refrigerant vapor to the compressor 2001 is at a temperature lower than the freezing point of water, and so may be too cold for use in chilling the water dispensed by the dispenser 100. However, indicated by the dashed lines in FIG. 12B, the cycle can be modified (e.g., by extending the length of the evaporator tubing) such that the temperature of the refrigerant at the input to the compressor is at a desired temperature (e.g. around or above the freezing point of water). That is, the isothermal process 5-1 may be extended to include a non-isothermal process 1-1' that brings the temperature of the refrigerant to the desired temperature. The refrigerant at the desired temperature may then be used to chill the water in the dispenser 100, e.g., by winding the refrigerant line going into the compressor around the water tank 1104, as show in FIGS. 11A, 11B, and 11C.

It is to be understood that the above described refrigeration scheme is only one of many possible configurations. In various embodiments, as refrigeration scheme known in the art may be used (e.g., schemes featuring a cascaded refrigeration cycle, thermoelectric refrigeration, etc.). In various embodiments, the system 2000 may be used to cool the water in the dispenser using any suitable technique known in the art. For example, in various embodiments where the system 1200 uses a circulating refrigerant, refrigerant at a suitable temperature from any point of the cycle may be used to cool the water of the dispenser 100.

As will be understood by one skilled in the art, in various embodiments, the dispenser 100 may be integrated in other types of appliances including: ice makers, freezers, coffee makers, flavored beverage dispensers, etc.

Figure 8:
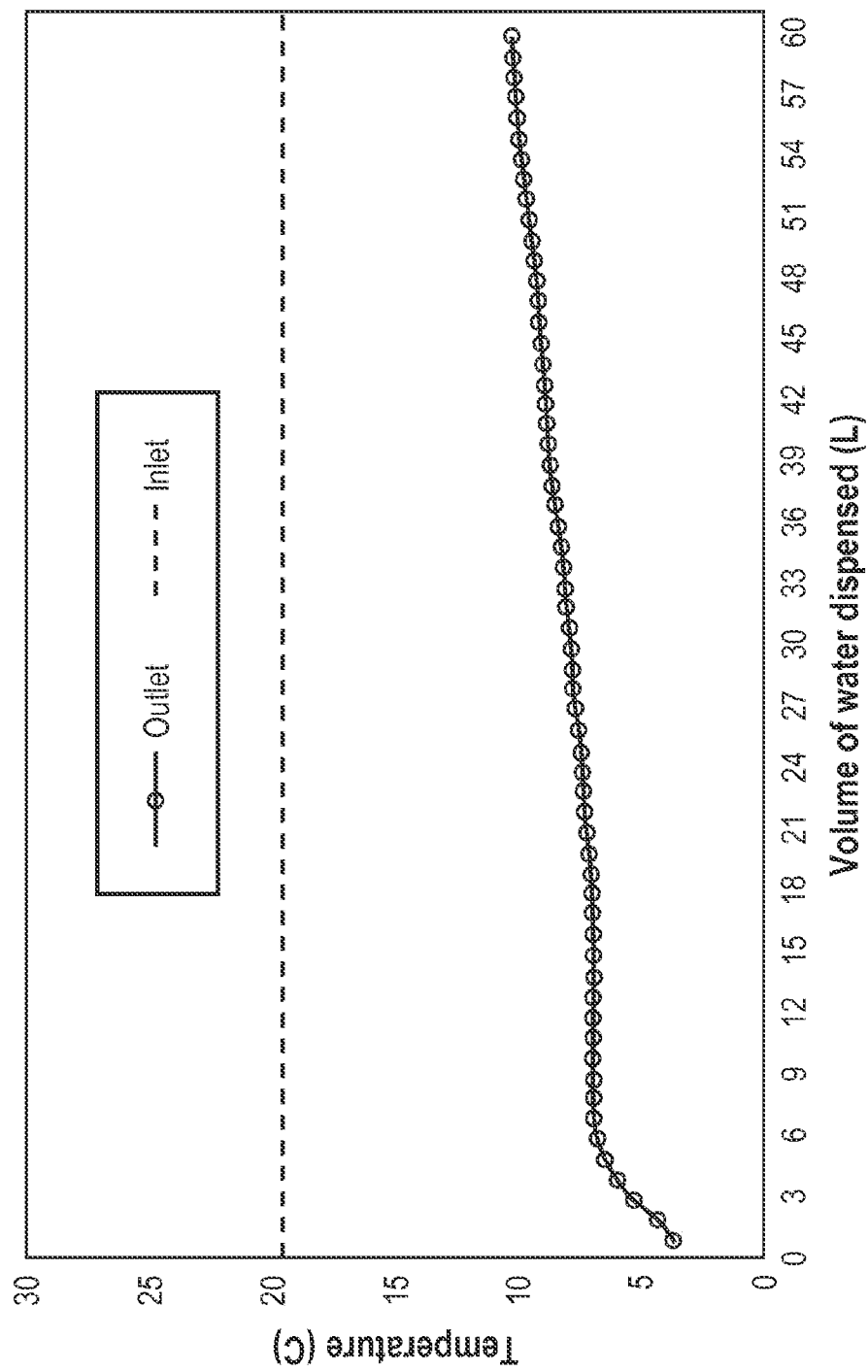
FIG. 8 is a chart of water input and output temperature as a function of the volume of water dispensed by an exemplary dispenser.

In various embodiments, the dispenser advantageously dispenses chilled carbonated water at a desirable flow rate and carbonation level. In some embodiments, the chilled water dispensing line is configured to receive water at a temperature of about 20 C or greater, and dispense chilled water at a temperature of about 10 C or less at a flow rate of about 10 L/hour or more, 25 L/hour or more, 50 L/hour or more, e.g. in the range of 1-200 L/hour or any subrange thereof. For example, as shown in FIG. 8, in one embodiment, dispensed water temperature remains around 10° C. while dispensing about 60 liters in one hour, for a dispense rate of 60 L/hour.

Figure 9:
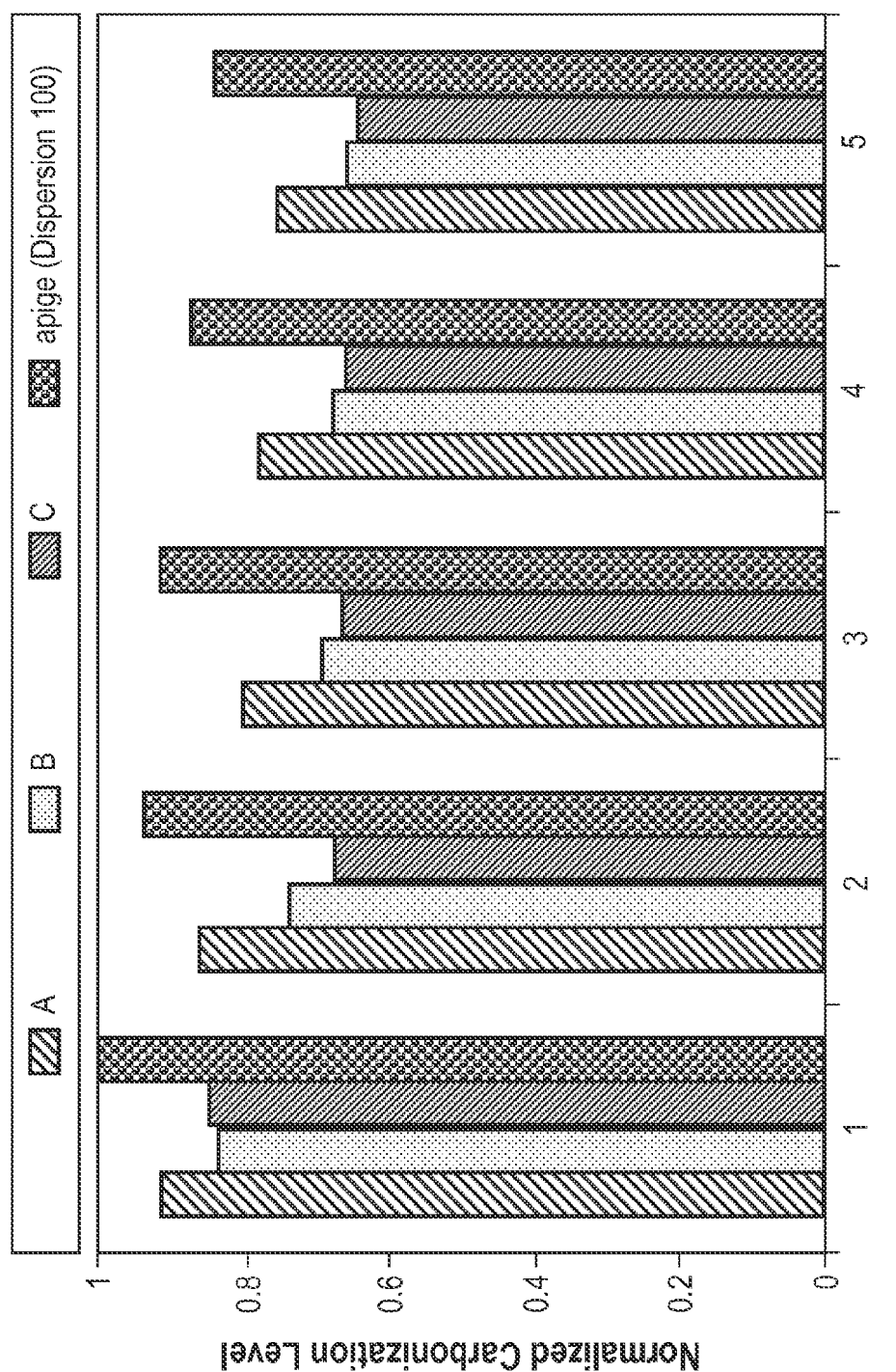
FIG. 9 is a chart comparing the carbonation level of carbonated water dispensed by a dispenser system to that of three conventional carbonated water products.

Another important performance characteristic is the quality of carbonation achieved. FIG. 9 shows the normalized carbonation levels tested and compared to carbonated water products available in the market (A, B, and C). Absolute carbonation levels were obtained using a carbonation tester Model T-03-567 (Terriss Consolidated Industries, Inc.). Values were normalized using a maximum absolute carbonation level of 3.7. As can be seen in FIG. 9, the carbonation level achieved using the dispenser 100 produces higher quality carbonated water without the need for a saturator tank or other cumbersome equipment. In some embodiments, the carbonation level (in grams of carbon dioxide per liter of water, measured at a temperature of 10 C) is 2 g/L or more, 5 g/L or more, 10 g/L or more, 15 g/L or more, 20 g/L or more, e.g., in the range of 1-20 g/L or any suitable subrange thereof.

The components described above may be made of any suitable material. In some embodiments, one or more of the components are formed from or include a plastic (e.g., a thermoplastic) or polymer material (e.g., PFTE, PV, PU, nylon, etc.), a metal (e.g., copper, bronze, iron, steel, stainless steel, etc.), a composite, etc. The components may be fabricated using any suitable technique including, e.g., molding (e.g., injection molding), machining (e.g., using one or more computer numerical controlled "CNC" tools such as a mill or lathe), etc.

Any suitable connection may be used to provide fluid communication between various components. The connections may be permanent (e.g., glued) or detachable (e.g., using threaded connections). Any threaded connections may be national pipe thread tapered thread (NPT) or national pipe thread tapered thread fuel (NPTF) standard connections. In some embodiments, the threaded connections provide leak proof fittings mechanically, without the need for Teflon thread tape or similar applications.

The examples described above are presented with reference to providing a dispenser for a flow of carbonated water. However, as will be understood by one skilled in the art, the devices and techniques described herein may be applied to dispensing any suitable fluid flow, including any suitable mixed flow of liquid and gas.

The above-described systems and methods (including controller 200) can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, optical disks, or solid state devices/memories).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a viewer, the above described techniques can be implemented on a computer having a display device. The display device can, for example, be a cathode ray tube (CRT) and/or a liquid crystal display (LCD) monitor. The interaction with a viewer can, for example, be a display of information to the viewer and a keyboard and a pointing device (e.g., a mouse or a trackball) by which the viewer can provide input to the computer (e.g., interact with a viewer interface element). Other kinds of devices can be used to provide for interaction with a viewer. Other devices can, for example, be feedback provided to the viewer in any form of sensory feedback (e.g., visual feedback, auditory feedback, or tactile feedback). Input from the viewer can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical viewer interface, a Web browser through which a viewer can interact with an example implementation, and/or other graphical viewer interfaces for a transmitting device. The components of the system can be interconnected by any form or medium of digital data communication (e.g., a communication network). Examples of communication networks include a local area network (LAN), a wide area network (WAN), a personal area network (PAM), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The communication network can include, for example, a packet-based network and/or a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., Zigbee, bluetooth, time division multiple access (TDMA) network, global system for mobile communications (GSM) network), and/or other circuit-based networks.

The communication device can include, for example, a computer, a computer with a browser device, a telephone, an IP phone, a mobile device (e.g., cellular phone, personal digital assistant (PDA) device, laptop computer, electronic mail device), and/or other type of communication device. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An apparatus for dispensing water comprising:
   a main inlet configured to receive water from a source;
   a chilled water line, comprising:
      an in-line carbonator;
      a carbonator water inlet valve configured to selectively direct water from the main inlet to the carbonator;
      a carbonator gas inlet valve configured to selectively direct carbonating gas to the carbonator; and
      a chilled water line outlet;
   a heat exchanger configured to chill water passing through the chilled water dispensing line, wherein the heat exchanger comprises a cooling tank configured to receive water from the main inlet and at least a portion of the chilled water line is immersed in the cooling tank;
   a controller configured to control the carbonator water and gas inlet valves;
   a cooling tank fill sensor in communication with the controller and configured to generate information indicative of a fill level of the cooling tank; and
   a cooling tank fill valve controlled by the controller and configured to selectively direct water from the main inlet to the cooling tank;
   wherein:
      when the carbonator water inlet valve is open and the carbonator gas inlet valve is closed, the chilled water line dispenses still water at the chilled water line outlet;
      when the carbonator water inlet valve is open and the carbonator gas inlet valve is open, the chilled water line dispenses carbonated water at the chilled water line outlet; and
      the controller is configured to control the operation of the cooling tank fill valve based on the information indicative of a fill level of the cooling tank.

2. The apparatus of claim 1, further comprising:
   an unchilled water line comprising:
   an unchilled water inlet valve configured to selectively direct water from the main inlet to an unchilled water line outlet;
   wherein the unchilled water inlet valve is controlled by the controller.

3. The apparatus of claim 1, further comprising:
   a hot water line comprising:
   a hot water inlet valve configured to selectively direct water from the main inlet to a hot water line outlet;
   a heater which heats water passing through the hot water line; and
   a hot water line outlet.

4. The apparatus of claim 1, wherein the in-line carbonator is immersed in the cooling tank.

5. The apparatus of claim 1, wherein the chilled water line comprises a coil immersed in the cooling tank.

6. The apparatus of claim 3, comprising a dispenser nozzle in fluid communication with the chilled water line outlet, the unchilled water line outlet, and the hot water line outlet.

7. The apparatus of claim 1, wherein the chilled water line comprises a water pump configured to pump water to the carbonator.

8. The apparatus of claim 1, wherein the chilled water line comprises a flow compensator configured to receive water from an outlet of the carbonator, modify the flow, and direct the flow towards the chilled water line outlet.

9. The apparatus of claim 1, wherein the carbonator comprises:
   a conduit;
   an inlet to a flow path on the proximal end of the conduit;
   one or more dispersion elements arranged within the conduit;
   a passive accelerator within the conduit;
   a rigid impact surface immediately downstream of the passive accelerator; and
   a retention network connected to the distal end of the conduit.

10. The apparatus of claim 1, wherein the carbonator comprises:
    a conduit;
    an inlet for directing carbon dioxide and water into the conduit;
    a rigid surface within the conduit; and
    a restriction within the conduit for accelerating the carbon dioxide and water to a speed sufficient such that when the carbon dioxide and water collide with the rigid surface they create an energy density sufficient to solubilize carbon dioxide in water.

11. The apparatus of claim 1, further comprising a filter.

12. The apparatus of claim 11, wherein the filter is arranged such that all water passing from the main inlet to each of the chilled water line, unchilled water line, and hot water line passes through the filter.

13. The apparatus of claim 3, wherein the heater is configured to heat water in the hot water line to a temperature of 85 C or more.

14. The apparatus of claim 1, wherein the controller is configured to modulate the state of the gas inlet valve while the apparatus is dispensing carbonated water to adjust a carbonation level of the dispensed carbonated water.

15. An apparatus for dispensing water comprising:
a dispenser integrated in a refrigerator, the dispenser comprising:
  a main inlet configured to receive water from a source;
  a chilled water line, comprising:
    an in-line carbonator;
    a carbonator water inlet valve configured to selectively direct water from the main inlet to the carbonator;
    a carbonator gas inlet valve configured to selectively direct carbonating gas to the carbonator; and
    a chilled water line outlet;
  a heat exchanger configured to chill water passing through the chilled water dispensing line, wherein the heat exchanger comprises a cooling tank configured to receive water from the main inlet and at least a portion of the chilled water line is immersed in the cooling tank;
  a controller configured to control the carbonator water and gas inlet valves;
  a cooling tank fill sensor in communication with the controller and configured to generate information indicative of a fill level of the cooling tank; and
  a cooling tank fill valve controlled by the controller and configured to selectively direct water from the main inlet to the cooling tank;

wherein:
  when the carbonator water inlet valve is open and the carbonator gas inlet valve is closed, the chilled water line dispenses still water at the chilled water line outlet;
  when the carbonator water inlet valve is open and the carbonator gas inlet valve is open, the chilled water line dispenses carbonated water at the chilled water line outlet; and
  the controller is configured to control the operation of the cooling tank fill valve based on the information indicative of a fill level of the cooling tank.

16. The apparatus of claim 15, further comprising:
an unchilled water line comprising:
  an unchilled water inlet valve configured to selectively direct water from the main inlet to an unchilled water line outlet;
wherein the unchilled water inlet valve is controlled by the controller.

17. The apparatus of claim 15, further comprising a dispenser nozzle in fluid communication with the chilled water line outlet.

18. The apparatus of claim 15, wherein the chilled water line comprises a water pump configured to pump water to the carbonator.

19. The apparatus of claim 15, wherein the chilled water line comprises a flow compensator configured to receive water from an outlet of the carbonator, modify the flow, and direct the flow towards the chilled water line outlet.

20. The apparatus of claim 15, further comprising the refrigerator.

21. The apparatus of claim 15, wherein the dispenser is mounted in a door of the refrigerator.

22. The apparatus of claim 15, wherein water in the chilled water line is cooled using a component of a refrigeration system of the refrigerator.

* * * * *